United States Patent
Kim et al.

(10) Patent No.: US 9,563,008 B2
(45) Date of Patent: Feb. 7, 2017

(54) LIGHTING MODULE AND LIGHTING APPARATUS INCLUDING THE SAME

(71) Applicant: LG Innotek Co., Ltd., Seoul (KR)

(72) Inventors: Han Gyoul Kim, Seoul (KR); Hwa Young Kim, Seoul (KR); Il Yeong Kang, Seoul (KR); Hyun Ha Shin, Seoul (KR); Sang Hoon Lee, Seoul (KR); Jin Wook Kim, Seoul (KR); Ji Hoo Kim, Seoul (KR); Jae Myeong Noh, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 136 days.

(21) Appl. No.: 14/271,888

(22) Filed: May 7, 2014

(65) Prior Publication Data

US 2014/0241008 A1    Aug. 28, 2014

Related U.S. Application Data

(63) Continuation of application No. 13/233,531, filed on Sep. 15, 2011, now Pat. No. 8,740,437.

(30) Foreign Application Priority Data

Sep. 17, 2010 (KR) .......... 10-2010-0091341
Sep. 24, 2010 (KR) .......... 10-2010-0092940

(Continued)

(51) Int. Cl.
*F21V 8/00* (2006.01)
*F21S 2/00* (2016.01)

(Continued)

(52) U.S. Cl.
CPC ........... *G02B 6/0083* (2013.01); *F21S 2/005* (2013.01); *F21V 5/007* (2013.01); *F21V 15/01* (2013.01);

(Continued)

(58) Field of Classification Search
CPC ......... F21S 2/005; F21V 15/02; F21V 15/015; F21V 21/005; F21V 5/007; F21V 7/05; G02B 6/0035; G02B 6/0061; G02B 6/0068; G02B 6/0073; G02B 6/0078; G02B 6/0085; G02B 6/0091
See application file for complete search history.

(56) References Cited

U.S. PATENT DOCUMENTS 5,107,408 A * 4/1992 Vernondier .......... E04F 19/061
                                                    362/219
8,287,151 B2 * 10/2012 Chung .................... F21S 2/005
                                                    362/249.02

(Continued)

FOREIGN PATENT DOCUMENTS

CN    101718887 A    6/2010
CN    102252180 A    11/2011

(Continued)

OTHER PUBLICATIONS

Search Reports of European Patent Office mailed Oct. 20, 2014 for Application No. 11179046.5.

(Continued)

*Primary Examiner* — Sharon Payne
(74) *Attorney, Agent, or Firm* — Birch, Stewart, Kolasch & Birch, LLP

(57) ABSTRACT

A lighting module includes:
  a case having
    a main base
    a first and a second extension parts extending from both sides of the main base in perpendicular direction to the surface of the main base, and
    a first and a second auxiliary bases extending from the first and the second extension parts respectively toward the center of the main base;

(Continued)

a substrate seated in a cavity formed by structurally connecting the main base, the first and the second extension parts and the first and the second auxiliary bases;

a plurality of light emitting devices disposed on one side of the substrate in the longitudinal direction of the substrate; and a driving driver disposed on the other side of the substrate, wherein at least one of the first and the second extension parts has an opening such that the driving driver is inserted into the first and the second extension parts.

19 Claims, 22 Drawing Sheets

(30) Foreign Application Priority Data

| Sep. 24, 2010 | (KR) | 10-2010-0092941 |
|---|---|---|
| Sep. 24, 2010 | (KR) | 10-2010-0092942 |
| Sep. 24, 2010 | (KR) | 10-2010-0092943 |
| Nov. 4, 2010 | (KR) | 10-2010-0109415 |
| Nov. 16, 2010 | (KR) | 10-2010-0113729 |
| Nov. 24, 2010 | (KR) | 10-2010-0117189 |
| Nov. 24, 2010 | (KR) | 10-2010-0117190 |

(51) Int. Cl.

| F21V 5/00 | (2015.01) |
|---|---|
| F21V 15/01 | (2006.01) |
| F21V 15/015 | (2006.01) |
| F21V 21/005 | (2006.01) |
| F21V 7/05 | (2006.01) |
| F21Y 101/00 | (2016.01) |

(52) U.S. Cl.
CPC ........... *F21V 15/015* (2013.01); *F21V 21/005* (2013.01); *G02B 6/0078* (2013.01); *G02B 6/0091* (2013.01); *F21V 7/05* (2013.01); *F21V 15/013* (2013.01); *F21Y 2101/00* (2013.01); *F21Y 2103/10* (2016.08); *F21Y 2115/10* (2016.08); *G02B 6/0035* (2013.01); *G02B 6/0061* (2013.01); *G02B 6/0068* (2013.01); *G02B 6/0073* (2013.01)

(56) References Cited

U.S. PATENT DOCUMENTS

| 2003/0223231 | A1* | 12/2003 | McCarthy | F21S 2/00 362/219 |
|---|---|---|---|---|
| 2005/0265051 | A1* | 12/2005 | Yamamoto | F21S 2/005 362/657 |
| 2008/0265781 | A1 | 10/2008 | Lin et al. | |
| 2009/0002595 | A1 | 1/2009 | Kim | |
| 2009/0086504 | A1 | 4/2009 | Kim | |
| 2009/0237957 | A1* | 9/2009 | Tsubaki | G02B 6/0068 362/615 |
| 2010/0237801 | A1 | 9/2010 | Hamada | |

FOREIGN PATENT DOCUMENTS

| EP | 2077464 A1 | 7/2009 |
|---|---|---|
| JP | 2001160312 A | 6/2001 |
| JP | 2004214094 A | 7/2004 |
| JP | 2006-147398 | 6/2006 |
| JP | 2006147398 A | 6/2006 |
| JP | 2006210183 A | 8/2006 |
| JP | 2006-351522 | 12/2006 |
| JP | 2006337794 A | 12/2006 |
| JP | 2007087782 A | 4/2007 |
| JP | 2007227074 A | 9/2007 |
| JP | 2009003081 A | 1/2009 |
| JP | 2009176604 A | 8/2009 |
| KR | 20090100004 A | 9/2009 |
| WO | 2009008190 A1 | 1/2009 |

OTHER PUBLICATIONS

Chinese Office Action, Issuing No. 2013071800838060 issued Jul. 23, 2013.
Korean Office Action for 10-2010-0109415 issued Aug. 19, 2011.
Chinese Office Action for application No. 201410437869.2 dated Nov. 17, 2015.

* cited by examiner

LIGHTING MODULE AND LIGHTING APPARATUS INCLUDING THE SAME

CROSS-REFERENCE TO RELATED APPLICATION

This application claims the priority of Korean Patent Application No. 10-2010-0091341, filed on Sep. 17, 2010, and Korean Patent Application No. 10-2010-0092940, filed on Sep. 24, 2010, and Korean Patent Application No. 10-2010-0092941, filed on Sep. 24, 2010, and Korean Patent Application No. 10-2010-0092942 filed on Sep. 24, 2010, and Korean Patent Application No. 10-2010-0092943, filed on Sep. 24, 2010, and Korean Patent Application No. 10-2010-0109415, filed on Nov. 4, 2010, and Korean Patent Application No. 10-2010-0113729, filed on Nov. 16, 2010, and Korean Patent Application No. 10-2010-0117189 filed on Nov. 24, 2010, and Korean Patent Application No. 10-2010-0117190, filed on in the KIPO (Korean Intellectual Property Office), the disclosure of which are incorporated herein in their entirety by reference.

BACKGROUND

1. Field

Embodiment may relate to a lighting module and a lighting apparatus including the same.

2. Background

In general, an electric bulb or a fluorescent lamp is commonly used as an indoor or outdoor lighting lamp. However, the electric bulb or the fluorescent lamp has a short life span, so that it should be frequently changed. Moreover, a conventional fluorescent lamp is degraded due to elapse of time for its use. As a result, it is often that its illuminance is gradually decreased.

In order to overcome such problems, a lighting apparatus is now being developed by using a light emitting device (hereinafter, referred to as LED). The LED is easy to control and has a rapid response speed, high electro-optic conversion efficiency, a long life span, low power consumption and high luminance. The LED is also used to create emotional lighting.

Meanwhile, the shapes of most of lighting apparatus to which the LED is applied are limited in accordance with the structure of the space in which the lighting apparatus is installed. Therefore, it is required that field of use of the lighting apparatus or a kind of a space in which the lighting apparatus is used is increased.

SUMMARY

The lighting device comprises: a first case; a second case; and a connection member connecting the first case with the second case, wherein each of the first case and the second case comprises a first edge part and a second edge part, wherein the first edge part of the first case comes in contact with the second edge part of the second case, and wherein the connection member surrounds the first edge part of the first case and the second edge part of the second case.

The lighting device comprises: a case comprising a first case and a second case; a connection member connecting the first case with the second case; and a coupling means coupling the case with the connection member, wherein each of the first case and the second case comprises a first edge part and a second edge part, wherein the first edge part of the first case comes in contact with the second edge part of the second case, wherein the connection member is disposed on the first edge part of the first case and the second edge part of the second case, wherein the first edge part of the first case has a first opening, wherein the second edge part of the second case has a second opening, wherein the connection member has a first recess corresponding to the first opening, and a second recess corresponding to the second opening, wherein the coupling means comprises a first coupling means coupling the first opening with the first recess, and a second coupling means coupling the second opening with the second recess.

The lighting module comprises: a case comprising: a main base comprising a first side, and having a first opening; and an extension part extending to the first side of the main base and having a second opening; a light source comprising: a substrate comprising a bottom surface disposed on the extension part, and a top surface, a plurality of light emitting devices disposed on the top surface of the substrate; and a driving driver which is disposed on the bottom surface of the substrate, is inserted into the second opening of the extension part, and controls the plurality of the light emitting devices; a connector inserted into the first opening of the main base and electronically coupled to the driving driver of the light source, wherein the connector is exposed to an outside of the main base, and wherein the driving driver is exposed to an outside of the extension part.

BRIEF DESCRIPTION OF THE DRAWINGS

Arrangements and embodiments may be described in detail with reference to the following drawings in which like reference numerals refer to like elements and wherein.

DETAILED DESCRIPTION

A thickness or a size of each layer may be magnified, omitted or schematically shown for the purpose of convenience and clearness of description. The size of each component may not necessarily mean its actual size.

It should be understood that when an element is referred to as being 'on' or "under" another element, it may be directly on/under the element, and/or one or more intervening elements may also be present. When an element is referred to as being 'on' or 'under', 'under the element' as well as 'on the element' may be included based on the element.

An embodiment may be described in detail with reference to the accompanying drawings.

Figure 1:
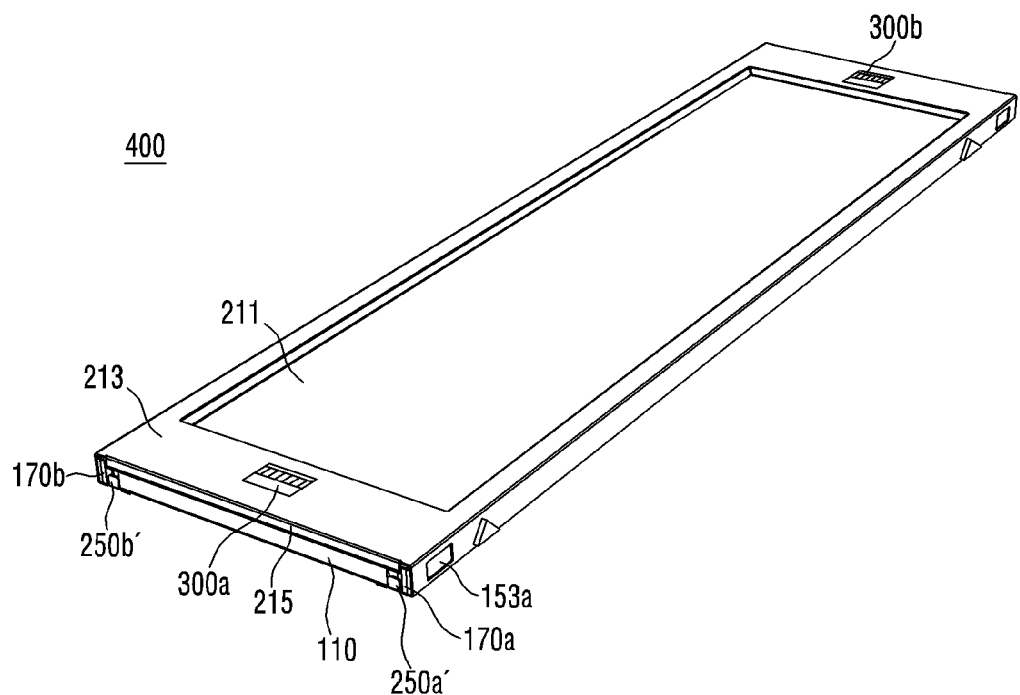
FIG. 1 is a perspective view for describing the structure of a lighting module according to an embodiment of the present disclosure.
Figure 2:
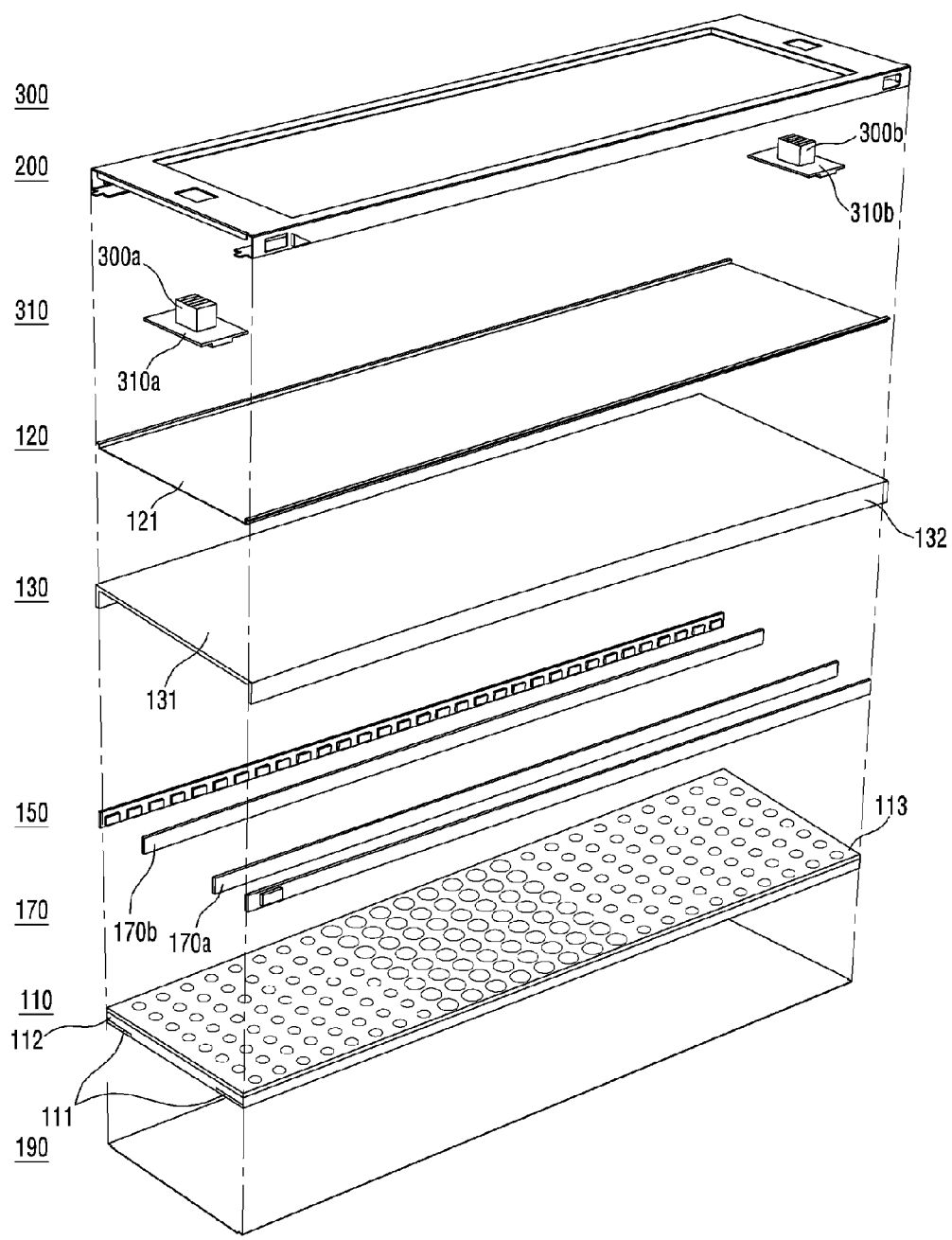
FIG. 2 is an exploded perspective view for describing the structure of the lighting module according to the embodiment of the present disclosure.
Figure 3:
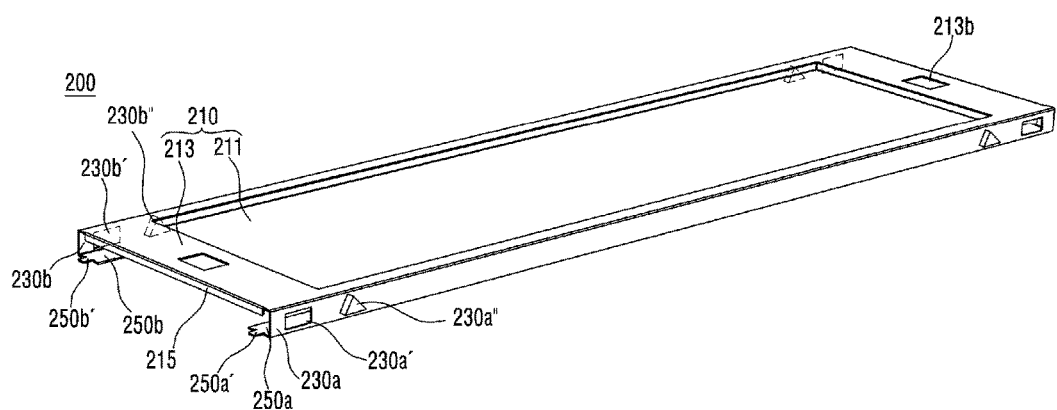
FIG. 3 is a perspective view for describing in detail the structure of a case in accordance with the embodiment of the present disclosure.
Figure 4:
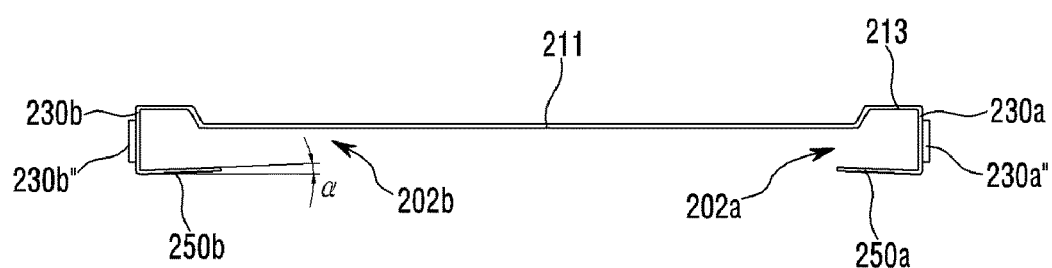
FIG. 4 is a cross sectional view for describing in detail the structure of the case in accordance with the embodiment of the present disclosure.
Figure 5:
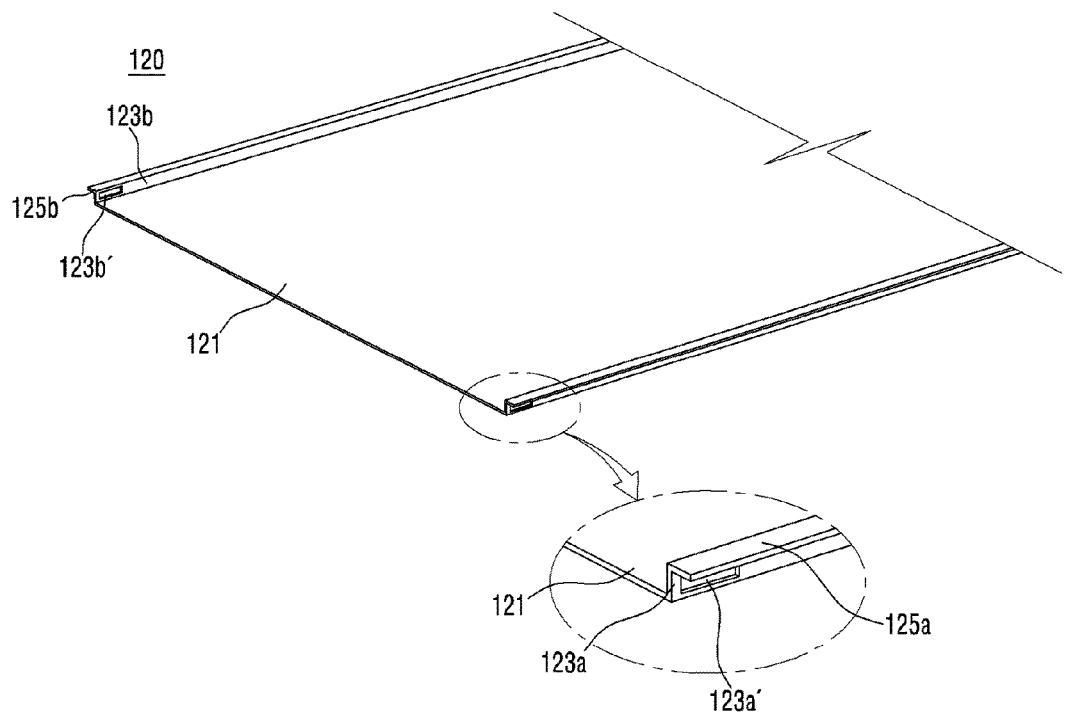
FIG. 5 is a perspective view for describing in detail the structure of a support plate in accordance with the embodiment of the present disclosure.
Figure 6:
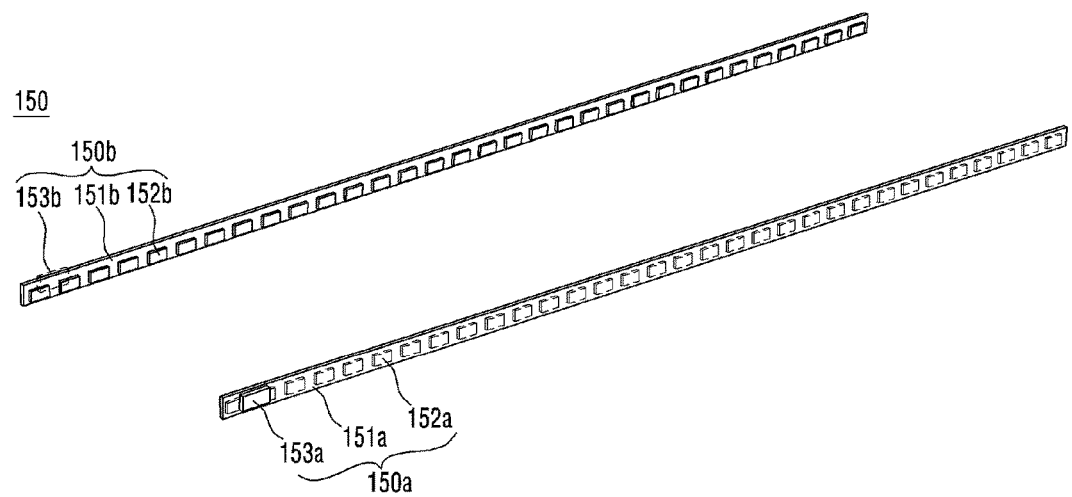
FIG. 6 is a perspective view for describing in more detail the structure of a light source unit in accordance with the embodiment of the present disclosure.

FIG. 1 is a perspective view for describing the structure of a lighting module according to an embodiment of the present disclosure. FIG. 2 is an exploded perspective view for describing the structure of the lighting module according to the embodiment of the present disclosure. FIG. 3 is a perspective view for describing in detail the structure of a case in accordance with the embodiment of the present disclosure. FIG. 4 is a cross sectional view for describing in detail the structure of the case in accordance with the embodiment of the present disclosure. FIG. 5 is a perspective view for describing in detail the structure of a support plate in accordance with the embodiment of the present disclosure. FIG. 6 is a perspective view for describing in more detail the structure of a light source unit in accordance with the embodiment of the present disclosure.

Referring to FIGS. 1 to 6, a lighting module 400 includes a case 200, a support plate 120, a first light source unit 150a, a second light source unit 150b, a first phosphor luminescent film 170a, a second phosphor luminescent film 170b, a light guide plate 110, a diffusion plate 190, a reflection plate 130, a first connector 300a and a second connector 300b.

<Case>

The case 200 is formed by assembling a plurality of flanges and it is recommended that the case 200 be extrusion molded in the form of a plate. The case 200 includes a main base 210, a first and a second extension parts 230a and 230b, and a first and a second auxiliary bases 250a and 250b.

The main base 210 has a shape of a rectangular plate and includes a depressed portion 211 and an edge 213. A portion apart at a certain interval from the end of the plate of the main base 210 is bent along the edge of the plate, so that the depressed portion 211 is formed in a central portion of the plate and the edge 213 is formed in the peripheral area of the plate.

The depressed portion 211 can prevent the reflection plate 130, the light guide plate 110 and the diffusion plate 190, all of which are disposed within the case, from moving by pushing them in contact with each other. The edge, particularly, the front and the back edges of the main base can minimize the connection path of a flexible printed circuit (not shown), that is an electrical connection medium between a driving driver and an input terminal, thereby reducing a manufacturing cost and preventing voltage from being reduced due to the length of the flexible printed circuit.

In the edge 213, the front and the back edges other than right and left edges connected to the first and the second extension parts 230a and 230b include a first upper central opening 213a and a second upper central opening 213b respectively.

Input terminals 310a and 310b are disposed in the first and the second upper openings 213a and 213b in order to supply electric power to driving drivers 153a and 153b. The first connector 300a on the input terminal 310a and the second connector 300b on the input terminal 310b are disposed in the first and the second upper openings 213a and 213b respectively, and then are exposed to the outside of the case 200.

The main base 210 includes a flange 215 extending from the front and the back edges. The flange 215 is substantially bent perpendicular to the surface of the main base. The flange 215 can prevent a structure inserted into the case, for example, the diffusion plate, the light guide plate and the reflection plate and the like from being separated in a direction of the front or the back of the main base.

The first and the second extension parts 230a and 230b extend from the edge of the main base 210 respectively and are substantially bent perpendicular to the surface of the main base 210. End portions of the first and the second extension parts 230a and 230b include a first and a second lateral openings 230a' and 230b'.

Guides 230a" and 230b" are projected from the outer surfaces of the first and the second extension parts 230a and 230b respectively. The guides 230a" and 230b" are disposed adjacent to the first and the second lateral openings 230a' and 230b'. The surface of the guides may have various shapes. It is recommended for the surface shape of the guide to have a triangular shape of which one side is inclined in such a manner as to be mechanically stably fixed to an extension part 630 of a connecting member 600 which will be described below.

The extension part of the connecting member to be described below is fixed and supported by being seated in the guides 230a″ and 230b″.

The first and the second auxiliary bases 250a and 250b extend from the first and the second extension parts 230a and 230b respectively toward the center of the main base 210. The first and the second auxiliary bases 250a and 250b extend substantially in parallel with the surface of the main base.

Therefore, a first cavity 202a and a second cavity 202b are formed on both inner sides of the case 200. The first and the second auxiliary bases 250a and 250b face each other at a certain interval.

Meanwhile, the first and the second auxiliary bases 250a and 250b of the case 200 are bent to extend from the first and the second extension parts 230a and 230b respectively in parallel with the main base 210. Here, it is recommended for the first and the second auxiliary bases 250a and 250b to be inclined at an acute angle ($\alpha<90°$) with respect to the first and the second extension parts 230a and 230b respectively. As a result, a structure to be inserted into the first and the second cavities 202a and 202b, for example, the diffusion plate, the light guide plate and the reflection plate and the like, can be more securely fixed and supported.

The first and the second auxiliary bases 250a and 250b include projections 250a' and 250b' respectively extending from the ends thereof in the longitudinal and vertical directions thereof. After a structure is inserted into the case, the projections 250a' and 250b' are bent perpendicular to the surfaces of the first and the second auxiliary bases 250a and 250b, so that the structure is fixed not to be separated from the case. Both sides of the case 200 extend in parallel with each other in the longitudinal direction thereof.

The case 200 can be made of a metallic material such as Al, Fe and the like. Moreover, it is desirable for the case to have elasticity.

<Support Plate>

The support plate 120 includes a base 121, a first member 123a, a second member 123b, a third member 125a and a fourth member 125b. The support plate 120 is disposed within the case 200 and comes in contact with the case.

The base 121 has a shape of a rectangular plate.

The first and the second members 123a and 123b extend substantially perpendicular to the surface of the base 121 respectively from both ends of the base 121. The end portions of the first and the second members 123a and 123b include openings 123a' and 123b' respectively.

The third and the fourth members 125a and 125b extend substantially perpendicular to the surfaces of the first and the second members 123a and 123b respectively from ends of the first and the second members 123a and 123b. For example, the third and the fourth members 125a and 125b can be formed to be substantially parallel with the base 121. The third and the fourth members 125a and 125b extend outwardly right and left from the base 121 with respect to the surfaces of the first and the second members 123a and 123b.

The support plate 120 having the aforementioned structure can be made of a metallic material such as Al, Fe and the like, which is the same as that of the case. Moreover, the support plate 120 may have elasticity.

The base 121 of the support plate 120 contacts with the depressed portion 211 of the main base 210 of the case 200. The third and the fourth members 125a and 125b contact with the edge 213 of the main base 210. The support plate 120 is disposed inside the lower portion of the main base 210 of the case 200.

Therefore, the case surrounds a structure to be disposed inside thereof, such as the reflection plate, the light guide plate and the diffusion plate. Here, the support plate 120 pushes the structure to the auxiliary bases 250a and 250b of the case, so that the adhesion between the auxiliary base and the structure is improved. As a result, a more stable supporting structure can be obtained.

The input terminals 310a and 310b are disposed respectively on the front and the back top surfaces of the base 121 of the support plate 120. The input terminals 310a and 310b correspond to the first and the second upper openings 213a and 213b of the case 200 respectively and are exposed to the outside of the case 200. The input terminals 310a and 310b are electrically connected to the first and the second connectors 300a and 300b respectively and electric power is supplied.

Meanwhile, the first and the second input terminals 310a and 310b are electrically connected to the driving drivers 153a and 153b respectively through a flexible printed circuit (FPC) (not shown). The flexible printed circuit penetrates through the openings 123a' and 123b' formed in the first and the second members 123a and 123b of the support plate 120, and is electrically connected to the driving driver 153a by the shortest distance.

<Light Source Module—Reflection Plate, Light Guide Plate, Light Source Unit, Diffusion Plate, Phosphor Luminescent Film>

<Reflection Plate>

The reflection plate 130 includes a body 131 having a rectangular plate shape corresponding to that of the support plate 120, a bent portion 132 extending from both end portions of the body 131.

The bent portion 132 is bent in the longitudinal direction of the reflection plate 130. The entire surface of the reflection plate 130 may be coated with a reflective material or only the body 131 may be coated with a reflective material. The reflection plate 130 may be made of a flexible plastic material as well as a metallic material.

The reflection plate 130 is placed under the support plate 120. The bent portion 132 of the reflection plate 130 contacts with a side of the light source unit 150, which has no light emitting device disposed thereon, and surrounds all of the light guide plate 110, the light source unit 150, the diffusion plate 190 and the phosphor luminescent film 170. Accordingly, when the parts of the lighting module are assembled, it is possible to prevent the parts from not being aligned with each other or specific parts from being separated.

Figure 7:
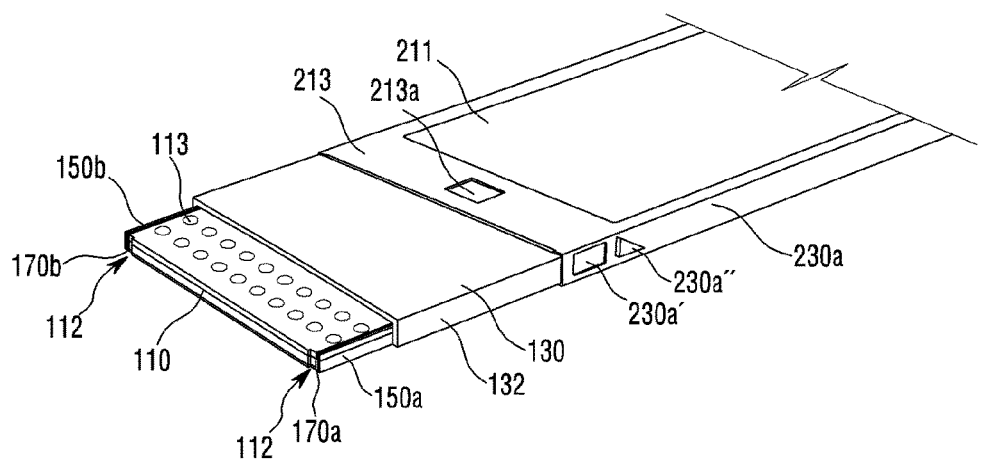
FIG. 7 is a view for describing the structure of a light source module in accordance with the embodiment of the present disclosure.

Additionally, when the lighting module is operated and heat generated from the light source units 150a and 150b is radiated through the case, the bent portion of the reflection plate, as shown in FIG. 7, functions as a medium. Therefore, it is recommended for the bent portion of the reflection plate to include a heat radiating material for improving a heat transfer effect.

When the light emitted from the light source unit 150 is emitted outward through the light guide plate 110, the reflection plate 130 prevent the light from being emitted toward the rear of the light guide plate.

Meanwhile, the bent portion vertically bent (not shown) is further formed at both side ends of the reflection plate 130. The bent portion contacts with a side of the light source unit 150, which has no light emitting device disposed thereon, and surrounds all of the light guide plate 110, the light source unit 150 and the phosphor luminescent film 170. Accordingly, when the parts of the lighting module are assembled, it is possible to more prevent the parts from not being aligned with each other or specific parts from being separated. Additionally, when the lighting module is operated and heat generated from the light source units 150a and 150b is radiated through the case 200, the bent portion functions as a medium. Therefore, the bent portion may include a heat radiating material for improving a heat transfer effect.

<Light Source Unit>

The light source unit 150 may include the first light source unit 150a and the second light source unit 150b. Otherwise, the light source unit 150 may include only any one of them.

The first light source unit 150a includes a substrate 151a, a light emitting device 152a and the driving driver 153a. The second light source unit 150b includes a substrate 151b, a light emitting device 152b and the driving driver 153b.

The substrates 151a and 151b are rectangular printed circuit boards.

A plurality of the light emitting devices 152a and 152b are provided and disposed on one sides of the substrates 151a and 151b respectively in the longitudinal direction of the substrates. The light emitting devices included in the first and the second light source units 150a and 150b are light emitting diodes emitting lights having the same color or mutually different colors. Therefore, light having various colors can be obtained through combination of the two different colors, thereby creating emotional lighting. The light emitting diodes 152a and 152b may emit at least one of blue light, red light and green light.

Though not shown in the drawing, the upper portion of the light emitting diode is sealed with a transparent resin, so that the light emitting diode emits its own color. For example, when a light emitting diode emits blue light, the light emitting diode is able to emit white light by sealing the upper portion of the blue light emitting diode with a resin including a yellow fluorescent material.

Though the light emitting diode is taken as an example of the light source in the embodiment, any light emitting device capable of emitting light can be used as the light source, without being limited to this.

The driving drivers 153a and 153b are disposed on the other sides of the substrates, which have no light emitting device disposed thereon, and more preferably are disposed on the end portions of the sides of the substrates.

The first light source unit 150a includes the light emitting device 152a disposed on one side of the substrate 151a and the driving driver 153a disposed on the other side of the substrate 151a. The second light source unit 150b includes the light emitting device 152b disposed on one side of the substrate 151b and the driving driver 153b disposed on the other side of the substrate 151b. The light emitting devices 152a and 152b are inserted into the first and the second cavities 202a and 202b of the case 200 respectively such that the one sides of the substrates on which the light emitting devices are disposed face each other. That is, the other sides of the substrates, which have no light emitting device disposed thereon, are parallel with the first and the second extension parts of the case.

While not shown in the drawing, a thermal pad may be disposed between the first and the second light source units 150a and 150b and the first and the second extension parts 230a and 230b of the case. The thermal pad transfers the heat generated from the light source unit through conduction to the case. The heat is radiated outwardly and a heat radiating characteristic can be improved.

Figure 8:
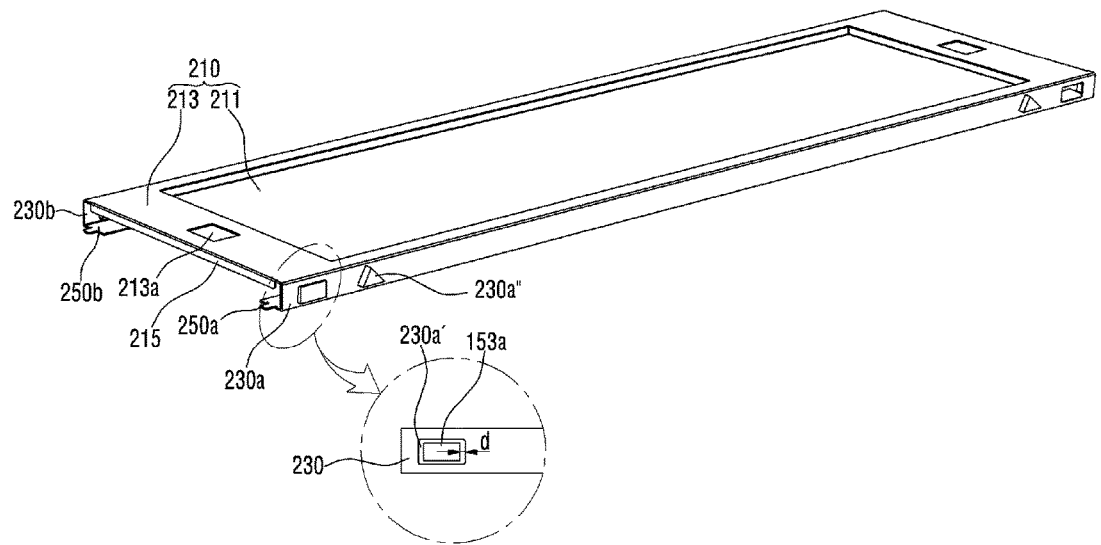
FIG. 8 is a view for describing how the case and the light source unit are coupled to each other in accordance with the embodiment of the present disclosure.

Meanwhile, the driving drivers 153a and 153b are, as shown in FIG. 8, inserted into the first and the second lateral openings 230a' and 230b' of the extension parts of the case and are exposed to the outside of the case. Therefore, it is easy to check the malfunction of the driving driver and is possible to overcome the difficulty in obtaining the spatial positions of the parts in a limited space due to the characteristic of the lighting module.

When the driving drivers 153a and 153b are respectively inserted into the first and the second lateral openings 230a' and 230b' of the extension parts, it is recommended that the driving drivers 153a and 153b are disposed spaced apart at an interval 'd' from the outer circumferences of the first and the second lateral openings 230a' and 230b'. This intends to obtain the withstand voltage characteristic of the driving driver at the time of operating the lighting module. When the interval 'd' between the driving driver and the outer circumferences of the first and the second lateral openings 230a' and 230b' is at least 2 mm, a stable withstand voltage characteristic can be obtained.

In addition, though not shown in the drawing, an adhesive protective film is attached to the boundary of the first and the second lateral openings 230a' and 230b' in order to protect the driving drivers 153a and 153b. The adhesive protective film can prevent external impurities from penetrate into the driving driver. It is desirable that the adhesive protective film should be formed of a transparent material allowing the driving driver to be seen through the adhesive protective film.

<Light Guide Plate>

The light guide plate 110, like the reflection plate 130, has a shape of a rectangular plate.

The side end surface perpendicular to the longitudinal direction of the light guide plate 110 has a groove 112. The groove 112 is formed at both side ends respectively. The projection 250a' of the first auxiliary base 250a of the case 200 and the projection 250b' of the second auxiliary base 250b of the case 200 are bent and seated in the groove 112. The light guide plate 110 within the case 200 is hereby stably supported and is not separated.

The light guide plate 110 converts a point light source into a surface light source. One side of the light guide plate 110 has a particular pattern 111 allowing light incident within the lighting module to be emitted to the outside of the lighting module. The particular pattern 111 functions to diffuse or scatter light and emits the light to the outside. The light guide plate 110 is made of a transparent resin and may be printed by using a silk-screen printing method and the like.

The light guide plate 110 is disposed in the direction of the optical path from the first light source unit 150a and the second light source unit 150b, and is inserted into the inside of the case in the longitudinal direction of the case 200. Here, both end portions of the light guide plate 110 are inserted into the first and the second cavities 202a and 202b of the case respectively.

At least a portion of the bottom surface of the light guide plate 110 according to the embodiment of the present disclosure has the particular pattern 111 allowing light incident within the lighting module to be emitted to the outside of the lighting module. The particular pattern 111 is formed not only in entire bottom surface of the light guide plate 110, but also only in a portion of the bottom surface of the light guide plate 110, for example, as shown in drawings, both side ends of the bottom surface of the light guide plate 110, that is, only an area close to a portion contacting with the first and the second auxiliary bases 250a and 250 of the case 200. The particular pattern 111 functions to diffuse or scatter light and emits the light to the outside. The particular pattern 111 of the light guide plate 110 according to the embodiment of the present disclosure can take the place of a conventional diffusion sheet for diffusing or scattering light and can simplify the configuration of the lighting module.

Also, a micro lens array layer (MLA) 113 is formed on the top surface of the light guide plate 110 according to the embodiment of the present disclosure. That is, the light guide plate 110 is formed integrally with the micro lens array layer 113. Light which has been emitted from the light source unit and incident on the light guide plate 110 should be emitted downward in the drawing. The micro lens array layer 113 changes or refracts the path of light traveling toward the upper portion of the light guide plate 110 among the light which has been emitted from the light source unit and incident on the light guide plate 110. For example, the micro lens array layer 113 collects, diffuses or scatters light. Then the light is reflected by the reflection plate 130 and is emitted downward through the light guide plate 110. Therefore, luminance uniformity is improved. The micro lens array layer 113 may have a uniform pattern or a pattern formed through combination of mutually different patterns. For example, the micro lens array layer 113 may have an entire convex lens pattern or an entire concave lens pattern or may have a pattern formed through combination of the convex lens pattern and the concave lens pattern. The lens pattern may or may not be uniform through the entire area. In other words, the sag of the lens pattern may or may not be uniform through the entire area. For example, the sag of a lens formed in some areas may be about 0.23 mm and the sag of a lens formed in another area may be about 0.47 mm What's more, the sag of a lens in some area of the micro lens array may be formed within ranges from 0.15 to 0.30 mm and from 0.40 to 0.55 mm More limitedly speaking, sags of some lenses of the micro lens array may be formed within ranges from 0.17 to 0.28 mm and from 0.42 to 0.53 mm. The micro lens array layer 113 may be formed of a typical material of a lens, for example, various synthetic resin materials.

<Phosphor Luminescent Film>

The phosphor luminescent film 170 may include the first phosphor luminescent film 170a and the second phosphor luminescent film 170b, each of which is placed between the side of the light guide plate 110 and the first light source unit 150a and between the side of the light guide plate 110 and the second light source unit 150b, respectively. The first phosphor luminescent film 170a and the second phosphor luminescent film 170b include various fluorescent materials therein. The first phosphor luminescent film 170a and the second phosphor luminescent film 170b can change the color of light by changing some wavelengths of the light emitted from the first and the second light source units 150a and 150b.

Though not shown in the drawing, the first phosphor luminescent film 170a and the second phosphor luminescent film 170b include a transparent resin and a fluorescent material 172 contained in the transparent resin. A curing agent or an additive may be included in the transparent resin. The curing agent cures the transparent resin. The additive disperses uniformly the fluorescent material in the transparent resin. Additionally, a diffusing agent may be included in the transparent resin. The diffusing agent improves the refraction of the light source and increases the excitation ratio of the fluorescent material.

<Diffusion Plate>

The diffusion plate 190 is inserted into the case 200 and is placed under the light guide plate 110 in order to diffuse and emit the light emitted from the light guide plate 110. Here, both ends of the diffusion plate 190 are inserted into the first and the second cavities 202a and 202b of the case respectively.

As such, since the lighting module according to the embodiment of the present disclosure is formed in the form of a single module emitting light, the lighting module itself can be used as a lighting device.

For convenience of description in the aforementioned embodiment of the present disclosure, a device including the first light source unit 150a, the second light source unit 150b, the first phosphor luminescent film 170a, the second phosphor luminescent film 170b, the light guide plate 110, the diffusion plate 190 and the reflection plate 130 is referred to as a light source module.

Figure 9:
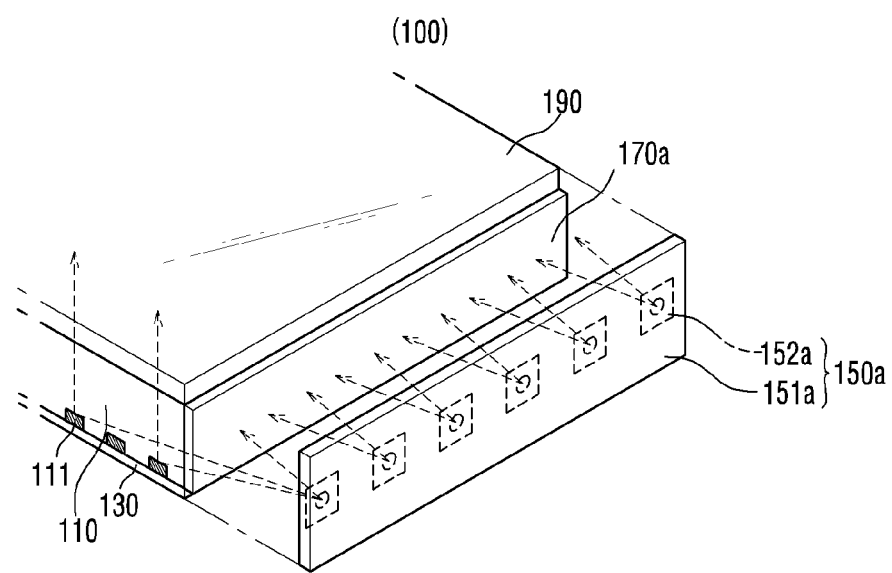
FIG. 9 is a view for describing the structure and operation principle of the light source module disposed within the case in accordance with the embodiment of the present disclosure.

FIG. 9 is a view for describing the structure and operation principle of the light source module disposed within the case in accordance with the embodiment of the present disclosure.

For convenience of description, an embodiment in which the light source module 100 includes the light guide plate 110, the reflection plate 130 the first light source unit 150a and the diffusion plate 190 will be provided.

The light guide plate 110 converts a point light source into a surface light source. One side of the light guide plate 110 has a particular pattern 111 allowing light incident within the lighting module to be emitted to the outside of the lighting module. The particular pattern 111 functions to diffuse or scatter light and emits the light to the outside. The light guide plate 110 is made of a transparent resin and may be printed by using a silk-screen printing method and the like.

The diffusion plate 190 may be disposed over the light guide plate 110. The diffusion plate 190 functions to allow light incident within the light guide plate 110 to be evenly emitted to the outside.

The reflection plate 130 is disposed under the light guide plate 110 and prevents the light incident within the light guide plate 110 from being emitted toward the rear of the light guide plate.

The first light source unit 150a is disposed at the side of the light guide plate 110. Any device capable of emitting light can be used as the first light source unit 150a. In the embodiment of the present disclosure, the light emitting device 152a of a light emitting diode is used as the first light source unit 150a. The first light source unit 150a includes a plurality of the light emitting diodes 152a and 152b arranged on the substrate 151a and is optically connected to the light guide plate 110, so that the light generated from the first light source unit 150a is incident within the light guide plate 110.

The first phosphor luminescent film 170a is disposed between the light guide plate 110 and the first light source unit 150a and includes various fluorescent materials therein. The first phosphor luminescent film 170a changes the color of light by changing some wavelengths of the light emitted from the first light source units 150a.

Figure 10A:
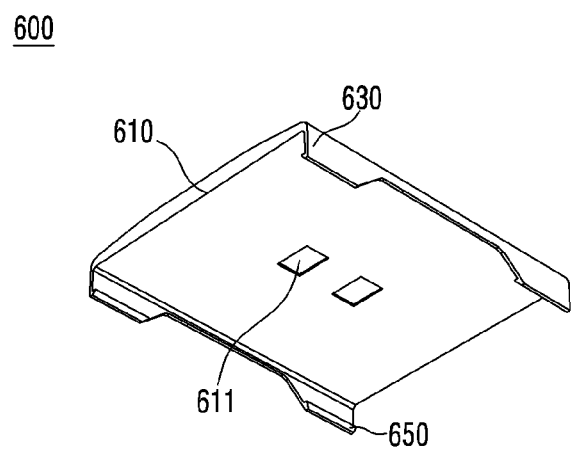
FIGS. 10A to 10C are views for describing a connecting member for coupling a plurality of the lighting modules in accordance with the embodiment of the present disclosure.
Figure 10B:
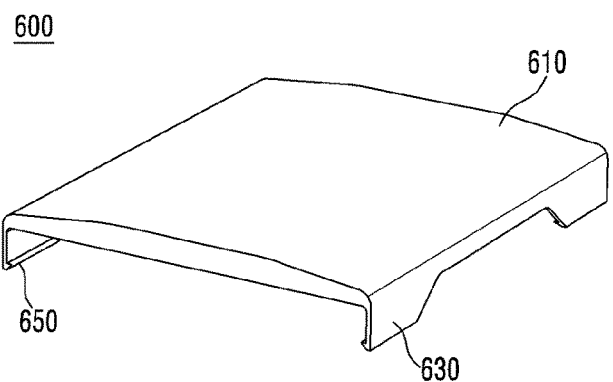
Figure 10C:
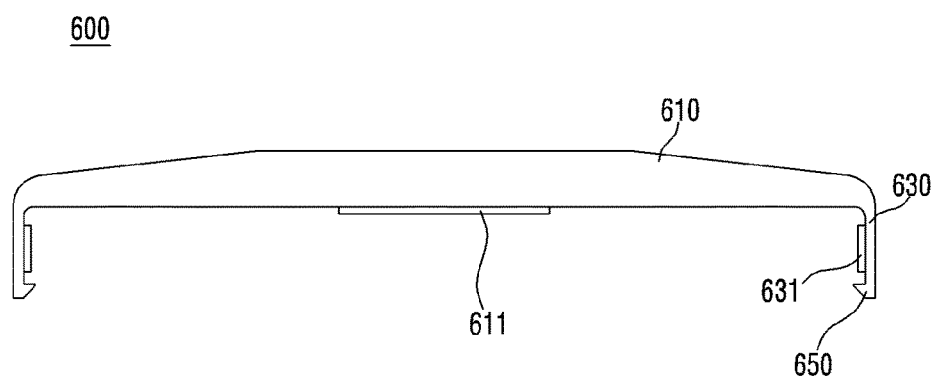
Figure 11:
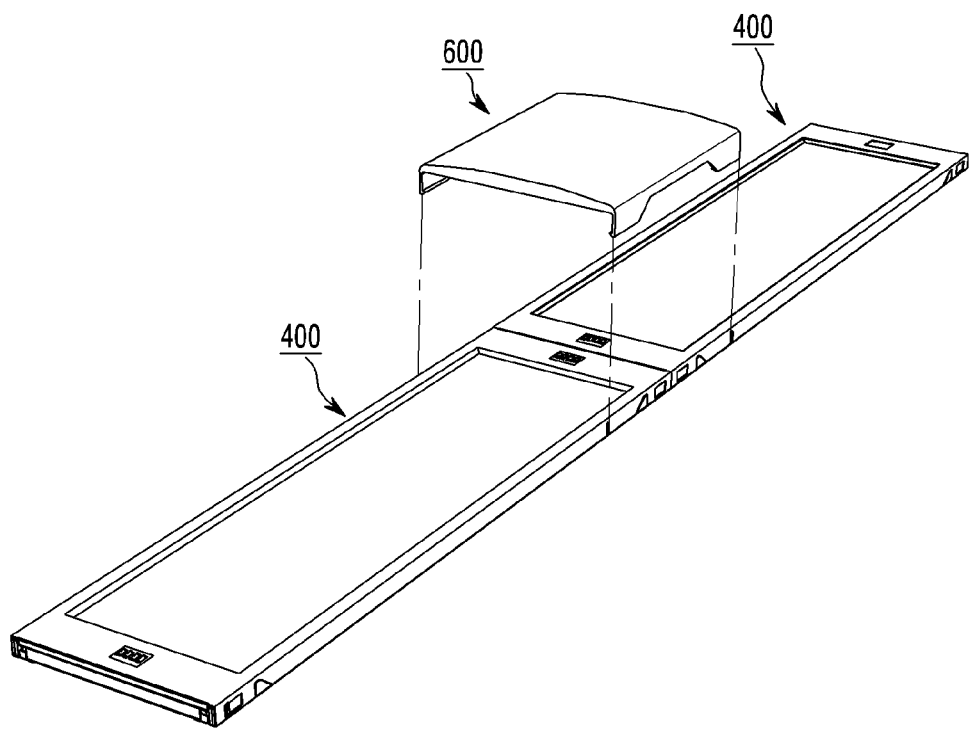
FIG. 11 is a view for describing how the plurality of the lighting modules are coupled to in accordance with the embodiment of the present disclosure.

FIGS. 10A to 10C are views for describing a connecting member for coupling a plurality of the lighting modules in accordance with the embodiment of the present disclosure. FIG. 11 is a view for describing how the plurality of the lighting modules are coupled to in accordance with the embodiment of the present disclosure.

First, as shown in FIGS. 10A to 10C, a connecting member 600 includes a base 610, an extension part 630 and a hook 650.

The base 610 has a bottom surface having a flat plate shape. The surface of the base 610 has a shape of a dome which is inclined toward both side ends thereof. Two connection terminals 611 are disposed on the bottom surface of the base 610 and are electrically connected with each other within the base through a wire. The two connection terminals 611 disposed on the bottom surface of the base are, as shown in FIG. 11, electrically connected to the connector formed in the edge of the main base of the case.

The extension part 630 extends perpendicularly from both ends of the base. The extension part 630 may have a central opening. The extension part 630 has an end inclined with respect to the other end in order that the inclined end may be mechanically fixed without moving to the guides 230*a*" and 230*b*" of the first and the second extension parts of the case.

An impact protector 631 like expanded polystyrene is installed on the inner side of the extension part 630. This intends to prevent the connecting member 600 from being broken due to the impact from the coupling of the connecting member 600 and the lighting module 400. This also intends to maximally prevent impact on the extension part which is very vulnerable to external impact after coupling the lighting modules by the connection member.

The hook 650 extends from the end of the extension part 630 and includes an end inclined toward the center of the base. When the connecting member 600 is coupled to the lighting module, the hook 650 is fastened by being caught by the bottom surface of the auxiliary base of the case. Here, the hook 650 is coupled to the lighting module by substantially using the elasticity of the extension part 630 of the connecting member.

FIGS. 12A to 12D are views for describing a way by which the plurality of the lighting modules are coupled in accordance with the embodiment of the present disclosure.

Figure 12A:
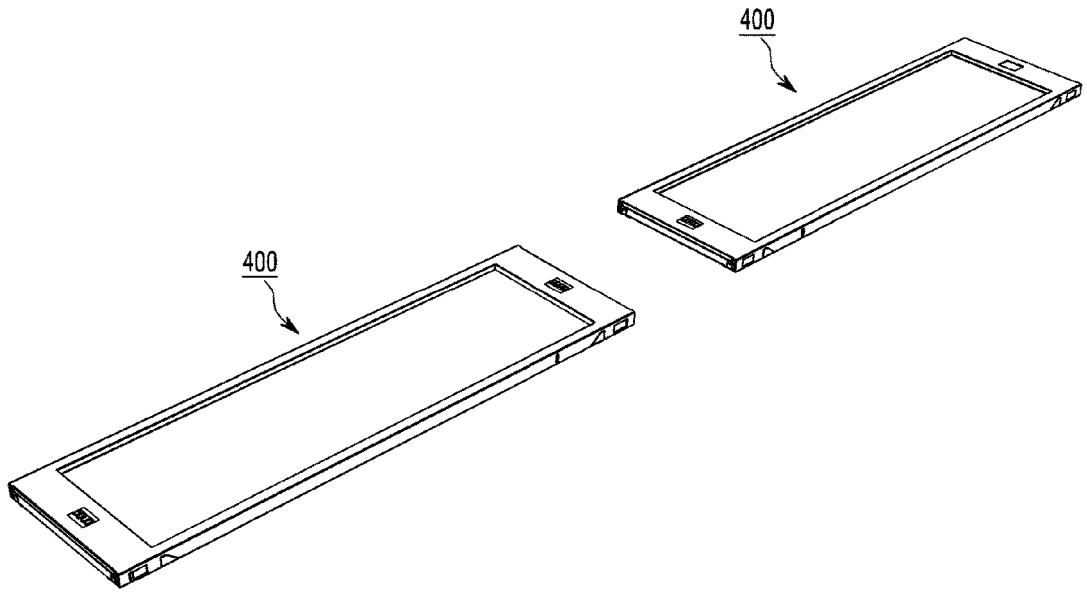
FIGS. 12A to 12D are views for describing a way by which the plurality of the lighting modules are coupled in accordance with the embodiment of the present disclosure.
Figure 12B:
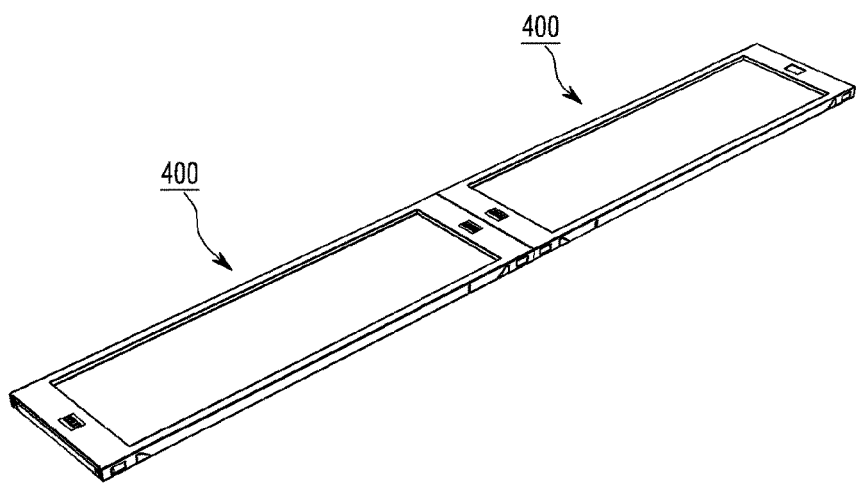
Figure 12C:
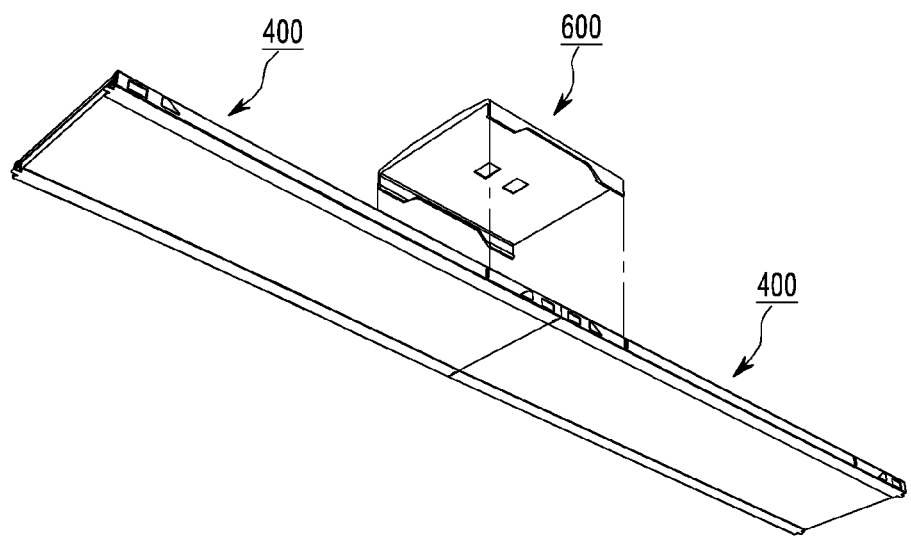
Figure 12D:
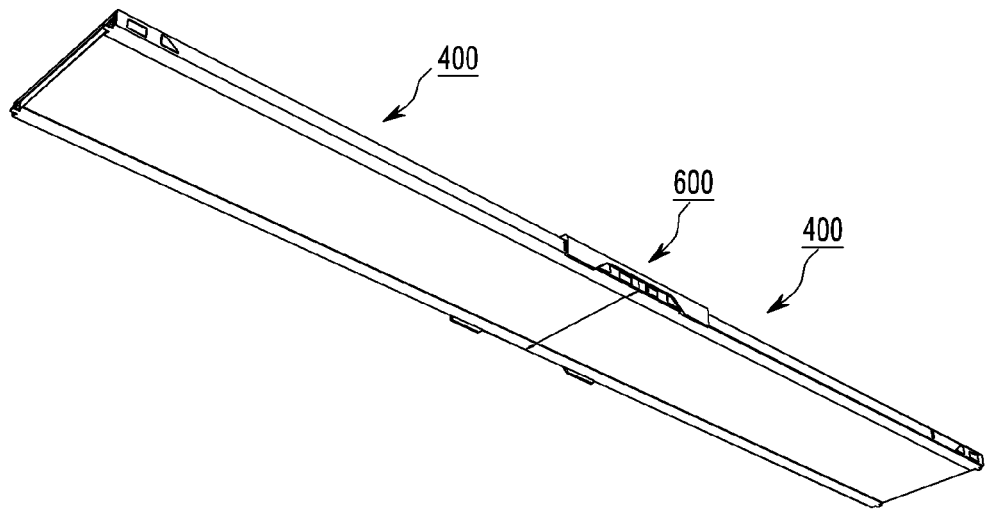

First, as shown in FIG. 12A, two lighting modules 400 are aligned on the same line. The ends of the aligned two lighting modules 400 come in contact with each other as shown in FIG. 12B. Subsequently, as shown in FIG. 12C, the lighting modules are coupled with each other by covering and compressing the edges with the connecting member 600 in such a manner as to surround the edges of the cases of the mutually contacted lighting modules. Here, the edge is covered and compressed such that the connection terminals 611 disposed on the base of the connecting member 600 are electrically connected to the connectors 300*a* and 300*b* disposed in the edge of the case 200, and also, one end of the extension part 630 of the connecting member 600 is fixed by being caught by the ends of the guides 230*a*" and 230*b*" projected outward from the case. Accordingly, as shown in FIG. 12D, the two lighting modules are electrically mechanically coupled with each other, so that one extended lighting device is completed.

Though the embodiment shows only how the two lighting modules are coupled to each other, three or more lighting modules can be mechanically electrically coupled with each other by using the same method as the aforementioned method.

The aforementioned lighting device is able to compensate for a supporting force which is reduced by the weight of the lighting module at the time of coupling the lighting modules and to thin the lighting device by coupling the lighting modules in the manner of surrounding the lighting module. As a result, it is possible to sufficiently overcome a spatial limitation caused by the volume of the lighting device when the lighting device is installed.

Figure 13:
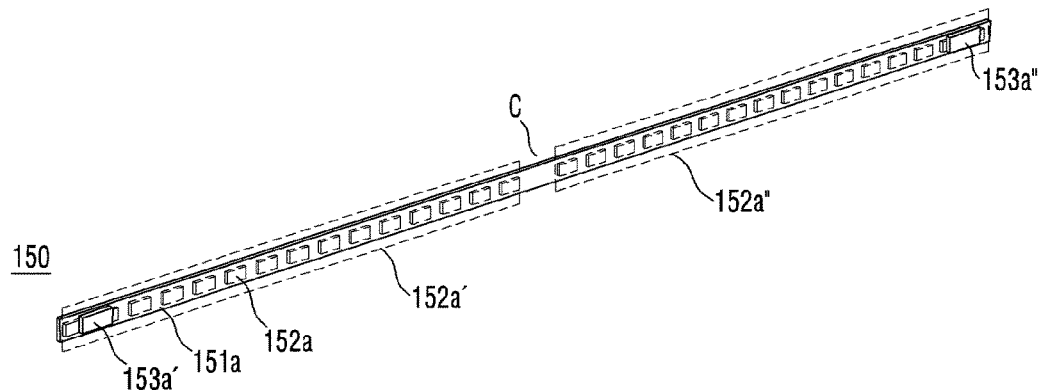
FIG. 13 is a view for describing another structure of the light source unit in accordance with the embodiment of the present disclosure.
Figure 14:
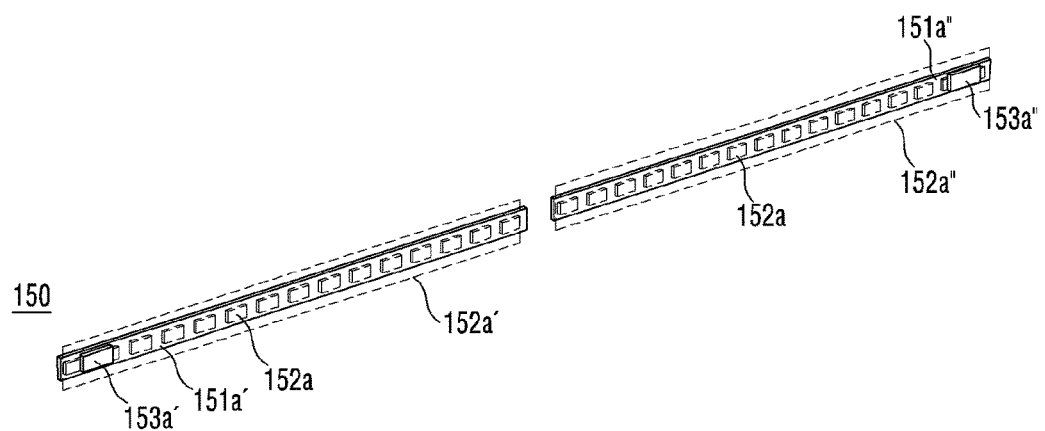
FIG. 14 is a view for describing further another structure of the light source unit in accordance with the embodiment of the present disclosure.
Figure 15:
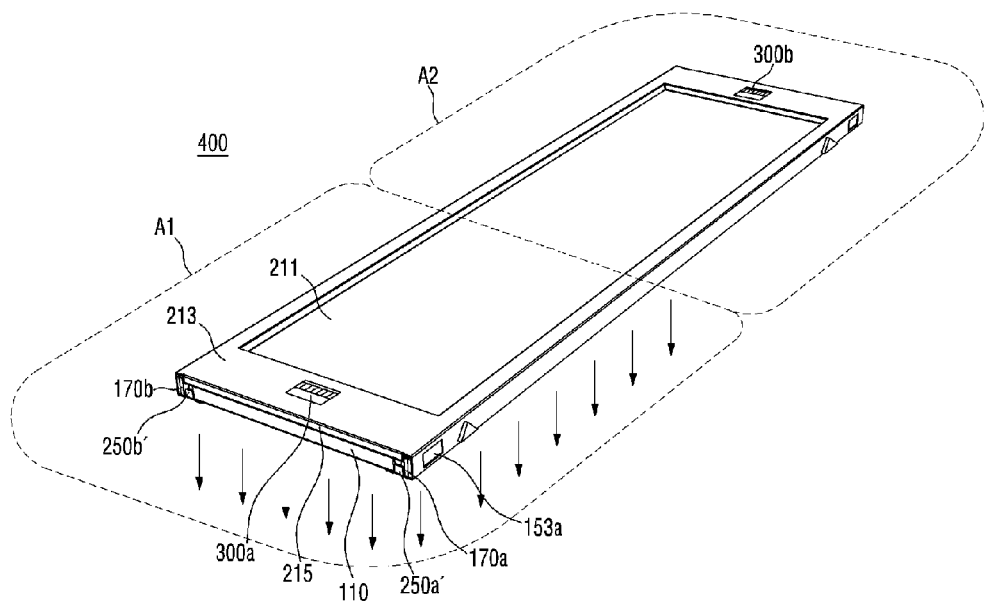
FIG. 15 is a view for describing how the light source unit is operated according to the structure thereof in accordance with the embodiment of the present disclosure.

FIG. 13 is a view for describing another structure of the light source unit in accordance with the embodiment of the present disclosure. FIG. 14 is a view for describing further another structure of the light source unit in accordance with the embodiment of the present disclosure. FIG. 15 is a view for describing how the light source unit is operated according to the structure thereof in accordance with the embodiment of the present disclosure.

First, referring to FIG. 13, the light source unit 150 includes a single substrate 151*a*, a first light emitting device group 152*a*', a second light emitting device group 152*a*", a first driving driver 153*a*' and a second driving driver 153*a*".

The first light emitting device group 152*a*' and the second light emitting device group 152*a*" include a plurality of light emitting devices 152*a* respectively and are disposed on one side of the substrate 151*a* in the longitudinal direction of the substrate 151*a*. Here, the substrate 151*a* is a rectangular printed circuit board. The middle portion "C" of the substrate 151*a* is electrically isolated. Accordingly, the first light emitting device group 152*a*' and the second light emitting device group 152*a*" are electrically isolated from each other and disposed on the substrate.

In order to drive the first light emitting device group 152*a*', the first driving driver 153*a*' is disposed on the other side of the substrate 151*a* instead of the one side of the substrate 151*a* on which the first light emitting device group is disposed. In order to drive the second light emitting device group 152*a*", the second driving driver 153*a*" is also disposed on the other side of the substrate 151*a* instead of the one side of the substrate 151*a* on which the second light emitting device group is disposed.

The light source unit 150 is seated in the first and the second cavities 202*a* and 202*b* of the single case 200 respectively and constitutes the lighting module.

Referring to FIG. 14, the light source unit 150 has the same structure as that of the embodiment of FIG. 13. In FIG. 14, however, the substrate is physically as well as electrically isolated and includes a first substrate 151*a*' and a second substrate 151*a*". Since the rest of the light emitting device group and the driving driver are the same as those of the embodiment of FIG. 13, descriptions thereof will be omitted.

When the aforementioned lighting module of which the light source unit is electrically isolated is installed and operated on indoor walls such as a wall, a ceiling and the like, it is possible to separate and control light generated from the lighting module. Therefore, the lighting module has high use flexibility allowing the light to be irradiated to only a required space. That is, as shown in FIG. 15, the lighting module is divided into a first light emitting device group area A1 and a second light emitting device group area A2. Light can be irradiated by separately driving only the first light emitting device group area A1 or, although not shown in the drawing, by driving only the second light emitting device group area A2. It is also possible to drive all of the first and the second light emitting device group areas at the same time.

Though only one light source unit is taken as an example in the embodiment, the light source unit can include the first light source unit and the second light source unit. Each of the first and the second light source units is formed in the same structure as that of the one light source unit.

Figure 16:
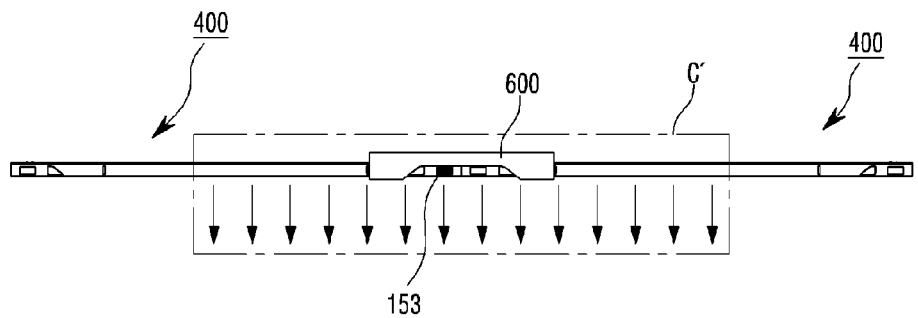
FIG. 16 is a view for describing how the plurality of the lighting modules are operated according to the structure thereof in accordance with the embodiment of the present disclosure.

FIG. 16 is a view for describing how the plurality of the lighting modules are operated according to the structure thereof in accordance with the embodiment of the present disclosure.

Referring to FIG. 16, a plurality of the lighting modules 400 are, like FIG. 11, mechanically electrically coupled with each other by the connecting member 600. Each lighting module 400 can be, as described above, separately driven through electrical isolation of the light source unit 150. However, in the lighting modules coupled by the connection member, a single driving driver 153*a*' is provided so as to drive the light source unit 150 disposed on both sides of the connection member 160. In other words, a required portion "C'" in the two lighting modules is driven by one driving driver instead of the plurality of the driving drivers described in FIG. 15. Since other particulars about the lighting module have been described above, has been described above, descriptions thereof will be omitted.

Such a lighting module can be, as shown in FIG. 15, separately driven according to the divided area, and therefore has high use flexibility.

Figure 17:
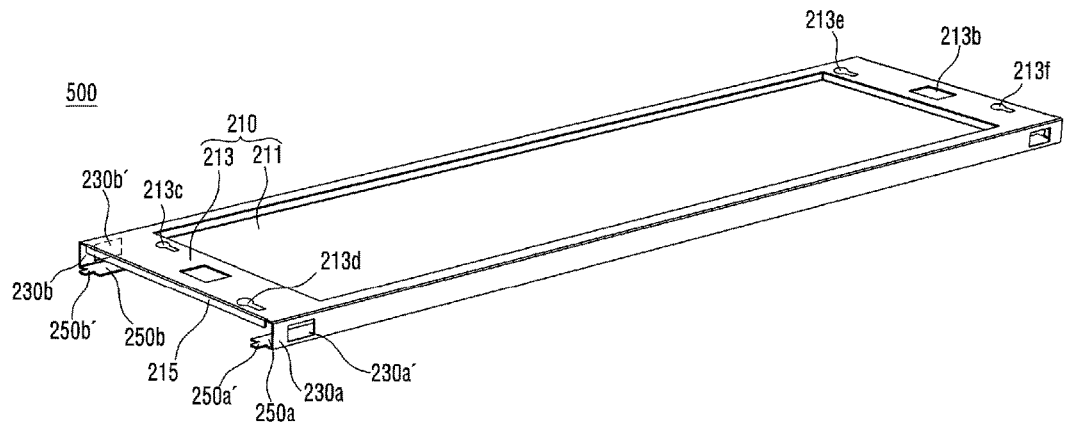
FIG. 17 is a perspective view showing the structure of another case in accordance with the embodiment of the present disclosure.

FIG. 17 is a perspective view showing the structure of another case in accordance with the embodiment of the present disclosure.

As shown, since a case 500 has a similar structure to that of FIG. 3, the same parts will be omitted. A third and a fourth upper openings 213c and 213d are formed in the front edge of the main base 210 such that the first upper opening 213a is located between the third upper opening 213c and the fourth upper opening 213d. A fifth and a sixth upper openings 213e and 213f are formed in the back edge of the main base 210 such that the second upper opening 213b is located between the fifth upper opening 213e and the sixth upper opening 213f. A coupling means 700 (see FIG. 19) is inserted into the third to the sixth upper openings 213c, 213d, 213e and 213f in order to couple the case 500 with a connection member 800 (see FIGS. 18A and 18B) to be described below.

The third to the sixth upper openings 213c, 213d, 213e and 213f may include an insertion hole "S" which allows the coupling means 700 to be inserted thereinto and a guide groove "G" which allows the coupling means 700 inserted into the insertion hole "S" to be moved in a sliding way and fixed.

The third to the sixth upper openings 213c to 213f may be formed to have the same shape as those of coupling grooves 830a, 830b, 830c, 830d, 830e and 830f of the connection member 800 to be described below. While the third upper opening 213c and the fourth upper opening 213d may be formed symmetrically with respect to a straight line passing through the first and the second upper openings 213a and 213b, any one of the third upper opening 213c and the fourth upper opening 213d may be formed, as shown in the drawing, relatively more adjacent to the end of the case 500 than the other.

For example, the fourth upper opening 213d may be formed relatively closer to the front end of the case 500 than the third upper opening 213c. The fifth upper opening 213e and the sixth upper opening 213f are formed in the same manner as described above. Preferably, when the fourth upper opening 213d is formed closer to the front end of the case 500 than the third upper opening 213c, the sixth upper opening 213f is formed closer to the back end of the case 500 than the fifth upper opening 213e.

That is, the third the fourth upper openings 213c and 213d and the fifth and the sixth upper openings 213e and 213f are symmetrical with each other with respect to a straight line which passes through the center of the case 500 and is perpendicular to a straight line passing through the first and the second upper openings 213a and 213b.

The case 500 is coupled to the connection member 800 by the coupling means 700. The case 500 can be coupled to the case 500 of another lighting module in the same manner as described above.

Figure 18A:
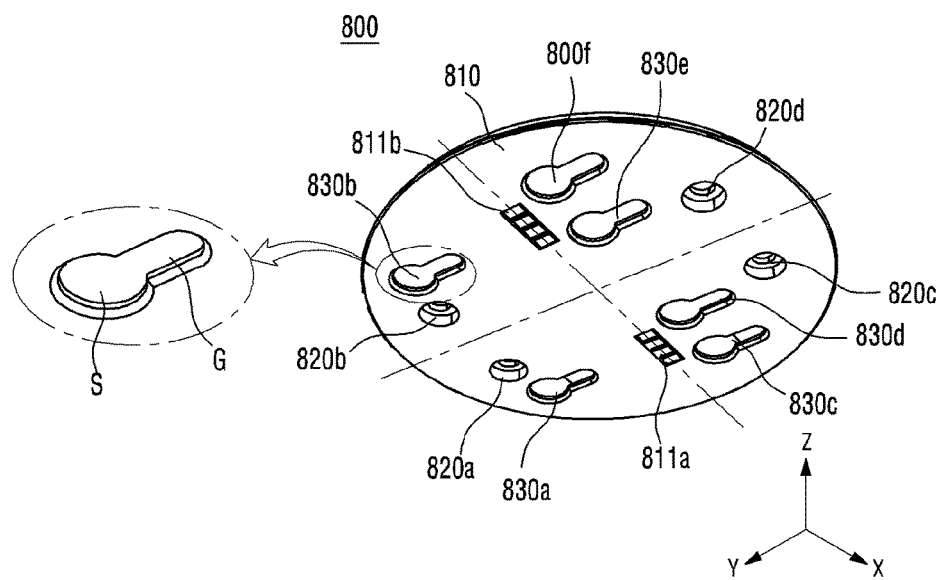
FIGS. 18A to 18B are views for describing a configuration of a connecting member for coupling a plurality of lighting modules in accordance with the embodiment of the present disclosure.
Figure 18B:
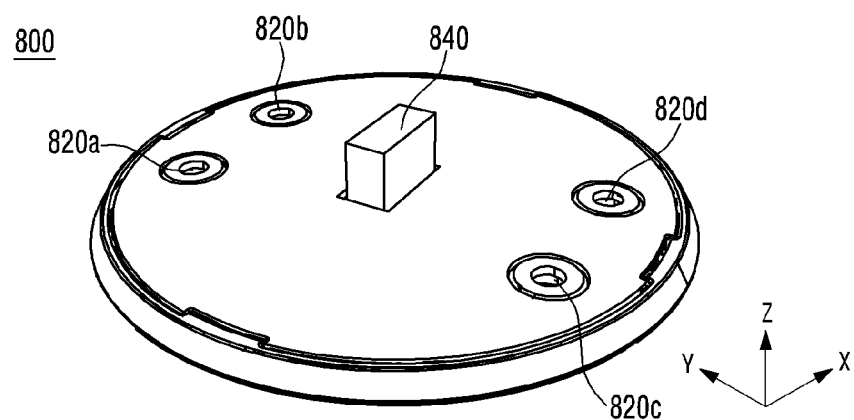
Figure 19:
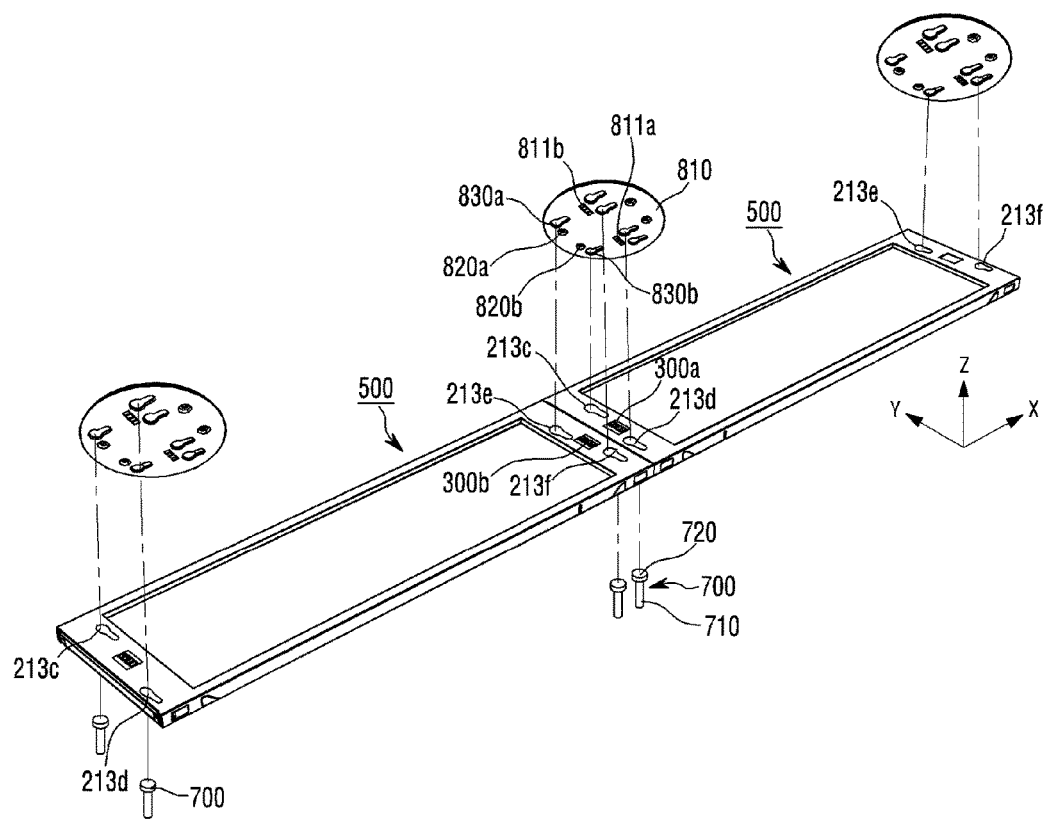
FIG. 19 is a view for describing how the plurality of the lighting modules according to the embodiment of the present disclosure are coupled.

FIGS. 18A to 18B are views for describing a configuration of a connecting member 800 for coupling a plurality of lighting modules in accordance with the embodiment of the present disclosure. FIG. 19 is a view for describing how the plurality of the lighting modules according to the embodiment of the present disclosure are coupled.

As shown in FIGS. 18A to 18B, the connection member 800 of the present disclosure includes a base 810, at least one locking groove 820a, 820b, 820c and 820d, at least one coupling groove 830a, 830b, 830c, 830d, 830e and 830f, and a projection 840. The projection 840 functions as an electrical connector.

In a plan view of the base 810, when the base 810 is coupled to the lighting module, the base 810 has a circular shape. The edge portion of the base 810 may have an outwardly inclined portion. Two connection terminals 811a and 811b may be formed on the bottom surface of the base 810. The two connection terminals 811a and 811b are electrically connected with each other within the base 810 through a wire. The two connection terminals 811a and 811b are, as shown in FIG. 19, electrically connected to the connectors 300a and 300b formed in the edge 213 of the main base 210 of the case 500.

At least one locking groove 820a, 820b, 820c and 820d is formed in the base 810. Though a first to a fourth locking grooves 820a, 820b, 820c and 820d are formed in the drawing, the number of the locking grooves is not limited to this.

Referring to FIG. 19, a separate fixing means for fixing the connection member 800 which is connected to the case 500 of the lighting module to other devices (for example, a lighting module support device) is inserted into the first to the fourth locking grooves 820a, 820b, 820c and 820d. For example, the connection member 800 and the lighting module support device can be fixed by inserting a screw, a nail and a bolt and the like into the first to the fourth locking grooves 820a, 820b, 820c and 820d. When the first to the fourth locking grooves 820a, 820b, 820c and 820d are coupled with the lighting module, the first to the fourth locking grooves 820a, 820b, 820c and 820d are formed symmetrically with respect to a straight line which passes through the center of the lighting module and extends in the longitudinal direction of the lighting module.

For example, as shown in the drawing, the first and the second locking grooves 820a and 820b may be formed symmetrically with the third and the fourth locking grooves 820c and 820d with respect to an x-axis in the drawing. In other words, the first and the second locking grooves 820a and 820b may be formed over the x-axis, and the third and the fourth locking grooves 820c and 820d may be formed under the x-axis.

What's more, the at least one coupling groove 830a, 830b, 830c, 830d, 830e and 830f may be formed in the base 810. Each of the coupling grooves 830a, 830b, 830c, 830d, 830e and 830f may include an insertion groove "S" which allows the coupling means 700 to be inserted thereinto and a guide groove "G" which allows the coupling means 700 inserted into the insertion groove "S" to be moved in a sliding way and fixed.

The six coupling grooves 830a, 830b, 830c, 830d, 830e and 830f may be formed as shown in the drawing. Also, another number of the coupling grooves may be provided. In the formation of the six coupling grooves 830a, 830b, 830c, 830d, 830e and 830f, with respect to a straight line passing through the connection terminals 811a and 811b formed on the bottom surface of the base 810, the two coupling grooves 830a and 830b may be formed on one side, and the four coupling grooves 830c, 830d, 830e and 830f may be formed on the other side. The coupling grooves 830a, 830b, 830c, 830d, 830e and 830f may, as shown in the drawing, partially penetrate through the base 810 from the bottom surface of the base 810, or may fully penetrate through the base 810.

When the connection member 800 is placed on the case 500 for the purpose of being coupled to the case 500, the coupling grooves 830*a*, 830*b*, 830*c*, 830*d*, 830*e* and 830*f* of the connection member 800 may be placed corresponding to the third to the sixth upper openings 213*c*, 213*d*, 213*e* and 213*f* of the case 500.

The six coupling grooves 830*a*, 830*b*, 830*c*, 830*d*, 830*e* and 830*f* may be formed. Four out of the six coupling grooves may correspond to the third to the sixth upper openings 213*c*, 213*d*, 213*e* and 213*f*.

As described above, the third upper opening 213*c* and the fourth upper opening 213*d* may be formed asymmetrically with respect to a straight line passing through the first and the second upper openings 213*a* and 213*b*. Here, the third upper opening 213*c* may correspond to the second coupling groove 830*b* among the six coupling grooves 830*a*, 830*b*, 830*c*, 830*d*, 830*e* and 830*f*. The fourth upper opening 213*d* which is formed closer to the end of the case 500 than the third upper opening 213*c* may correspond to the fifth coupling groove 830*e*.

In this manner, the fifth upper opening 213*e* and the sixth upper opening 213*f* of another lighting module may correspond to the first coupling groove 830*a* and the fourth coupling groove 830*d* respectively among the six coupling grooves 830*a*, 830*b*, 830*c*, 830*d*, 830*e* and 830*f*.

This is because the third the fourth upper openings 213*c* and 213*d* and the fifth and the sixth upper openings 213*e* and 213*f* are formed symmetrically with each other with respect to a straight line which passes through the center of the case 500 and is perpendicular to the longitudinal direction of the case 500.

That is, this is because in FIG. 19, the fourth upper opening 213*d* and the sixth upper opening 213*f* are formed relatively closer to the edge of the case 500, and the third upper opening 213*c* and the fifth upper opening 213*e* are formed relatively farther from the edge of the case 500.

When some of the coupling grooves 830*a*, 830*b*, 830*c*, 830*d*, 830*e* and 830*f* of the connection member 800 (for example, four coupling grooves) are placed corresponding to the third to the sixth upper openings 213*c*, 213*d*, 213*e* and 213*f* of the case 500, the coupling means 700 is inserted into the insertion holes "S" of the coupling grooves 830*a*, 830*b*, 830*c*, 830*d*, 830*e* and 830*f* and the insertion holes "S" of the third to the sixth upper openings 213*c*, 213*d*, 213*e* and 213*f*. Then, the coupling means 700 is moved along the guide groove "G", so that the connection member 800 can be coupled to the two lighting modules. When the connection member 800 couples one lighting module with another lighting module, the coupling grooves 830*a*, 830*b*, 830*c*, 830*d*, 830*e* and 830*f* which are placed on the one lighting module and the another lighting module can be electrically connected to each other according to the wiring type within the connection member 800. For example, when the lighting modules are coupled to each other by the connection member 800, the first coupling groove 830*a* can be electrically connected to the second coupling groove 830*b*, the third coupling groove 830*c* can be electrically connected to the fourth coupling groove 830*d*, and the fifth coupling groove 830*e* can be electrically connected to the sixth coupling groove 830*f*.

The coupling means 700 may be formed to have a shape having one rod 710 and a head 720 attached to the rod 710. The insertion holes "S" of the coupling grooves 830*a*, 830*b*, 830*c*, 830*d*, 830*e* and 830*f* and the insertion holes "S" of the third to the sixth upper openings 213*c*, 213*d*, 213*e* and 213*f* may be formed to have a sufficient size for the head 720 of the coupling means 700 to be inserted into the insertion hole "S". The guide groove "G" has a width less than that of the insertion hole "S". That is to say, it is recommended that when the head 720 of the coupling means 700 which has been inserted into the insertion hole "S" moves in a sliding way, the width of the guide groove "G" should prevent the head 720 from being separated from the guide groove "G" and allow the rod 710 to smoothly move. The insertion hole "S" may have at least one shape among a circular shape, an elliptical shape and a polygonal shape.

As such, since the connection member 800 is coupled to the cases 500 of one lighting module and another lighting module by inserting the coupling means 700 into the groove and moving the coupling means 700 in a sliding way, it is possible to easily couple them and to obtain the reliability of the coupling.

Meanwhile, in the coupling of the at least one lighting module, it is required that the end of an outermost lighting module be coupled to the connection member 800, and then be fixed to a device for supporting the entire lighting module (for example, a lighting module support device). Here also, the same connection member 800 as that described above can be used.

As described above, the third upper opening 213*c* and the fourth upper opening 213*d* of the case 500 are formed asymmetrically with respect to a straight line passing through the first and the second upper openings 213*a* and 213*b*. The third the fourth upper openings 213*c* and 213*d* and the fifth and the sixth upper openings 213*e* and 213*f* are formed symmetrically with each other with respect to a straight line which passes through the center of the case 500 and is perpendicular to the longitudinal direction of the case 500. Therefore, at the ends of the lighting modules at both ends, in other words, the ends of the lighting modules which are not coupled to another lighting module, the first coupling groove 830*a* and the third coupling groove 830*c* of the connection member 800 may correspond to the third upper opening 213*c* and the fourth upper opening 213*d* of the case 500 respectively.

Additionally, in FIG. 19, at the end of the outermost lighting module in the x-axis direction, the second coupling groove 830*b* and the sixth coupling groove 830*f* of the connection member 800 may correspond to the fifth upper opening 213*e* and the sixth upper opening 213*f* of the case 500 respectively. After the two upper openings formed in the end of the case 500 is placed corresponding to the two out of the coupling grooves of the connection member 800, the case 500 can be connected through the coupling means 700 to the connection member 800 in the same manner as described above.

Since at the end of the outermost lighting module, the coupling groove of the connection member 800 corresponds to the opening of the case 500 in such a manner described above, the connection member 800 is within the range of the case 500. Here, in order that the third coupling groove 830*c* or the sixth coupling groove 830*f* is used, the third coupling groove 830*c* and the sixth coupling groove 830*f* are formed in the connection member 800. However, at the end of the outermost lighting module, the connection member 800 can be also connected to the case 500 in the same position and manner as that in which the outermost lighting module is connected to another module.

In other words, in all of the lighting modules including the outermost lighting module, the third and the fourth upper openings 213*c* and 213*d* of the case 500 may be connected corresponding respectively to the second coupling groove

830*b* and the fifth coupling groove 830*e* of the connection member 800, and the fifth and the sixth upper openings 213*e* and 213*f* of the case 500 may be connected corresponding respectively to the first coupling groove 830*a* and the fourth coupling groove 830*d* of the connection member 800.

The connection member 800 connected to the lighting module is connected to another support device through a fixing means inserted into the locking grooves 820*a*, 820*b*, 820*c* and 820*d*.

Figure 20:
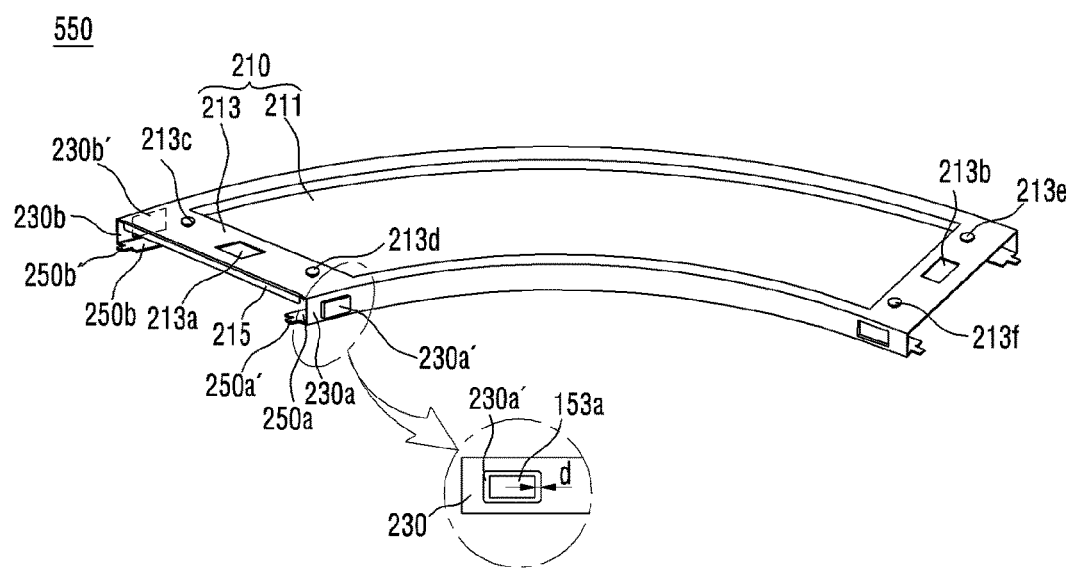
FIG. 20 is a perspective view showing the structure of further another case in accordance with an embodiment of the present disclosure.

FIG. 20 is a perspective view showing the structure of further another case in accordance with an embodiment of the present disclosure. As shown, a case 550 has a fan shape unlike the structure of FIG. 17. The rest of the partial features are the same as those of the case 500 of FIG. 17.

Meanwhile, not shown in the drawing, a structure to be inserted into the inside of the case, for example, a reflection plate, a support plate and a light guide plate and the like, has a structure corresponding to that of the case 550.

Figure 21A:
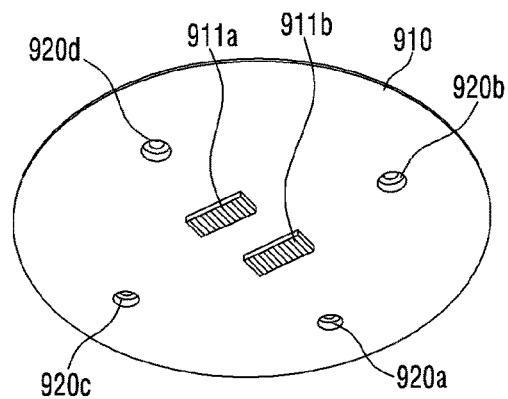
FIGS. 21A to 21B are views for describing a configuration of a connecting member for coupling a plurality of lighting modules in accordance with the embodiment of the present disclosure.
Figure 21B:
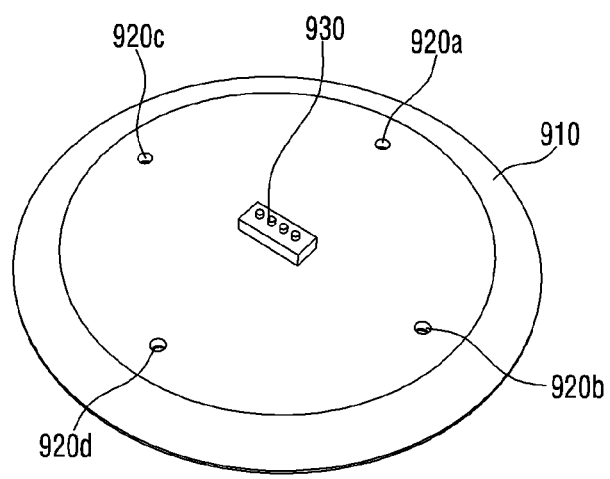
Figure 22A:
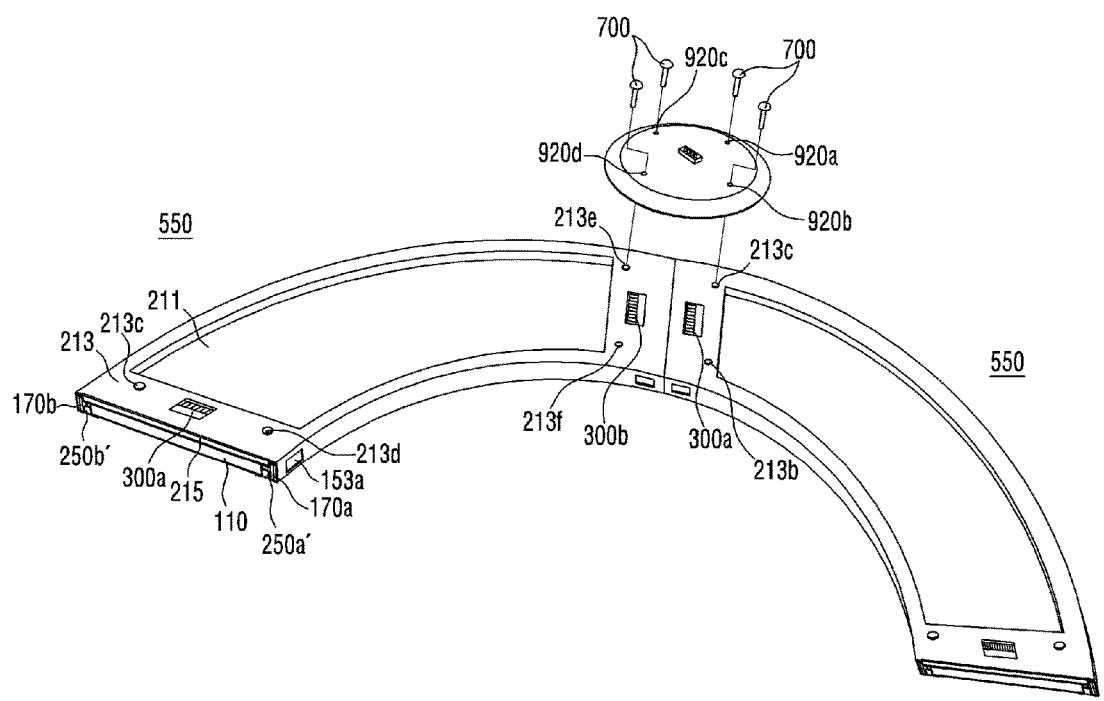
FIGS. 22A and 22B are views for describing how the plurality of the lighting modules according to the embodiment of the present disclosure are coupled.
Figure 22B:
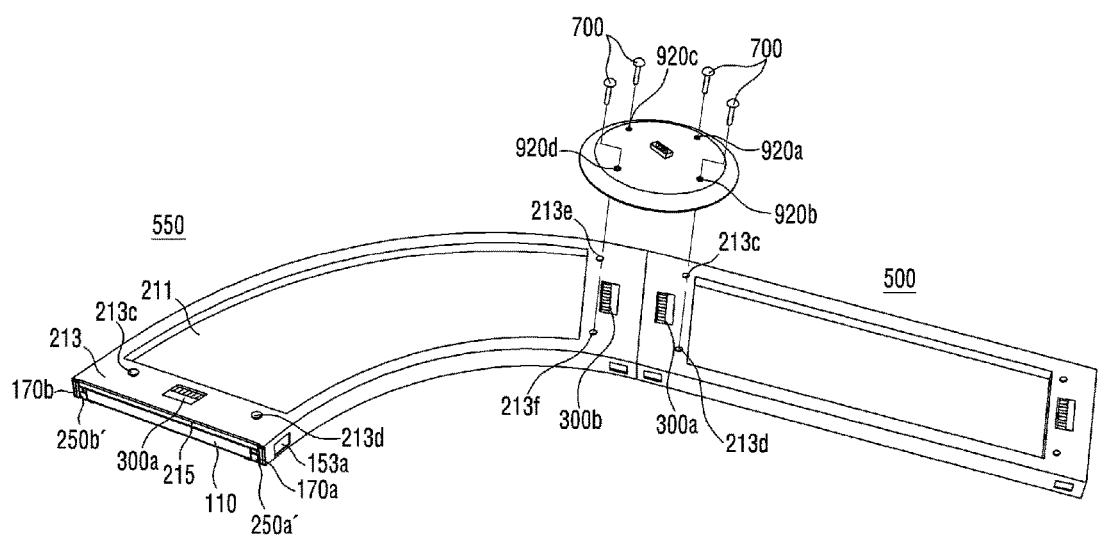

FIGS. 21A to 21B are views for describing a configuration of a connecting member for coupling a plurality of lighting modules in accordance with the embodiment of the present disclosure. FIGS. 22A and 22B are views for describing how the plurality of the lighting modules according to the embodiment of the present disclosure are coupled.

As shown in FIGS. 21A and 21B, a connection member 900 may be formed to include a base 910, at least one locking groove 920*a*, 920*b*, 920*c* and 920*d* and a projection 930.

In a plan view of the base 910, when the base 910 is coupled to the lighting module, the base 910 has a circular shape. The edge portion of the base 910 may have an outwardly inclined portion. Two connection terminals 911*a* and 911*b* may be formed on the bottom surface of the base 910. The two connection terminals 911*a* and 911*b* are electrically connected with each other within the base 810 through a wire. The two connection terminals 911*a* and 911*b* are, as shown in FIGS. 22A and 22B, electrically connected to the connectors 300*a* and 300*b* formed in an edge 213 of the main base 210 of the case 550.

At least one locking groove 920*a*, 920*b*, 920*c* and 920*d* is formed in the base 910. Though a first to a fourth locking grooves 920*a*, 920*b*, 920*c* and 920*d* are formed in the drawing, the number of the locking grooves is not limited to this.

Referring to FIGS. 22A and 22B, the first to the fourth locking grooves 920*a*, 920*b*, 920*c* and 920*d* correspond respectively to a third and a fourth upper openings 213*c* and 213*d*, and a fifth and a sixth upper openings 213*e* and 213*f*, which have been formed in the cases 550 of the two coupled lighting modules. A coupling means 700 is inserted into the locking grooves 920*a*, 920*b*, 920*c* and 920*d*. The coupling means 700 penetrate through the locking grooves 920*a*, 920*b*, 920*c* and 920*d*, and the third and the fourth upper openings 213*c* and 213*d*, and the fifth and the sixth upper openings 213*e* and 213*f* of the case 550 respectively.

For example, the one coupling means 700 may penetrate through the first locking groove 920*a* and the third upper opening 213*c*, and another coupling means 700 may penetrate through the second locking groove 920*b* and the fourth upper opening 213*d*. Subsequently, further another coupling member 700 may penetrate through the third locking groove 920*c* and the fifth upper opening 213*e* of another lighting module, and the rest of the coupling means 700 may penetrate through the fourth locking groove 920*d* and the sixth upper opening 213*f*. The coupling means 700 may have a nail shape, a screw shape, a pin shape and the like, or may have a shape in which a female screw is coupled to a male screw. The coupling means 700 allows one lighting module to be coupled to another lighting module.

As shown in FIG. 22, lighting modules including the fan-shaped case 550 according to the embodiment of the present disclosure may be coupled to each other. Otherwise, as shown in FIG. 22B, a lighting module including the fan-shaped case 550 according to the embodiment of the present disclosure may be coupled to a general bar-type lighting module.

FIGS. 23A to 23E are views showing an actual embodiment of a case where the plurality of the lighting modules are coupled in accordance with the embodiment of the present disclosure.

Figure 23A:
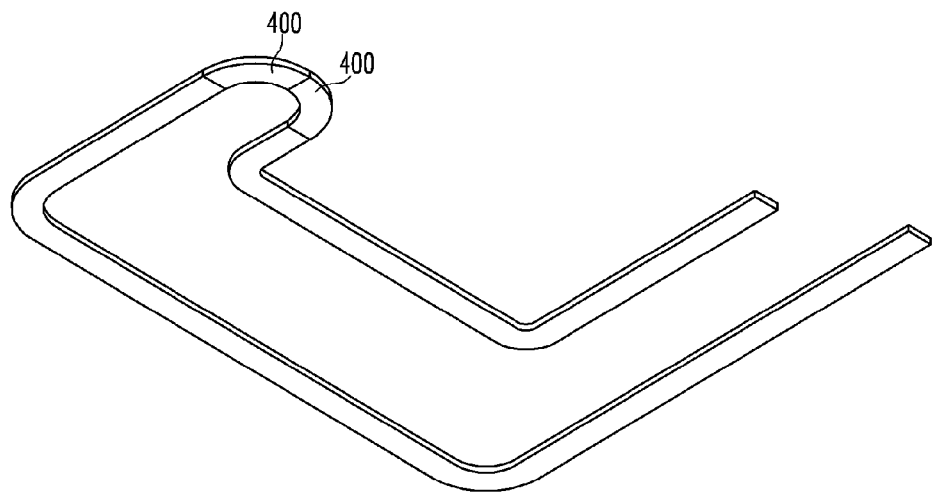
FIGS. 23A to 23E are views showing an actual embodiment of a case where the plurality of the lighting modules are coupled in accordance with the embodiment of the present disclosure.
Figure 23B:
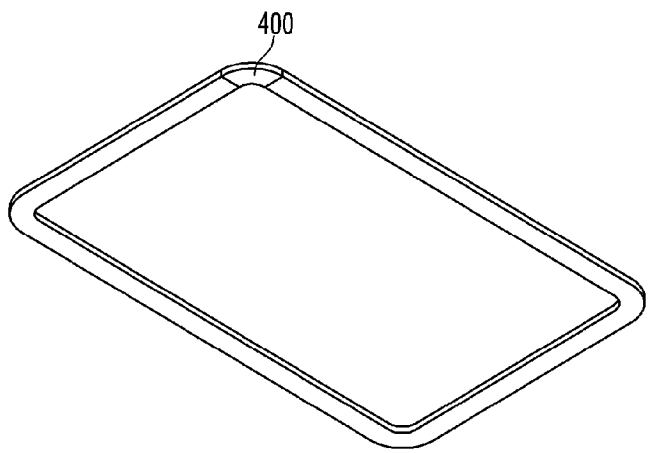
Figure 23C:
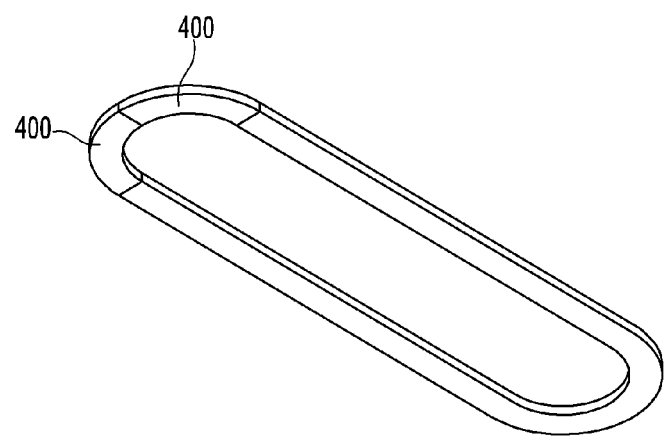

As shown in FIGS. 23A to 23C, it is possible to create variously shaped lighting devices by appropriately coupling the fan-shaped lighting module according to the embodiment of the present disclosure to the general bar-type lighting module.

Figure 23D:
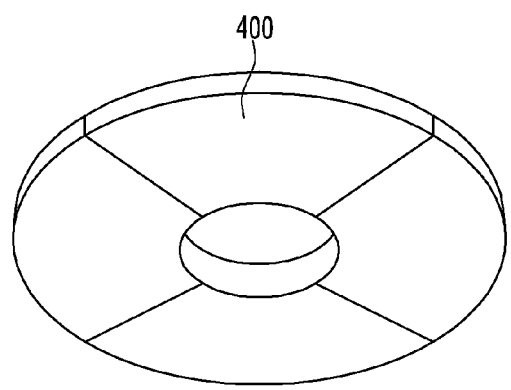

As shown in FIG. 23D, it is also possible to obtain a donut-shaped lighting device by coupling four fan-shaped lighting modules having a central angle of 90° in accordance with the embodiment of the present disclosure.

Figure 23E:
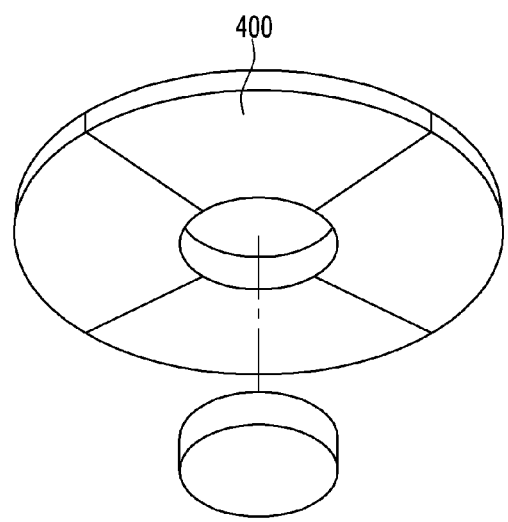

As shown in FIG. 23E, a circular lighting module may be inserted into the center of the donut-shaped lighting device shown in FIG. 23D. Accordingly, it is possible to create lighting where the colors of light emitted from the donut-shaped coupling structure may be different from the color of light emitted from the central circular lighting module.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A lighting device comprising:
a first case;
a second case; and
a connection member connecting the first case with the second case,
wherein each of the first case and the second case comprises
a top surface and a bottom surface, the bottom surface having a first opening,
a first edge part and a second edge part of the top surface, and
a first side part and a second side part disposed between the first edge part and the second edge part, wherein the first edge part of the first case comes in contact with the second edge part of the second case, wherein the first case comprises
a first light source disposed inside one of the first side part and the second side part of the first case, and
a first connector electrically connected to the first light source and disposed in the first edge part of the top surface of the first case, wherein the second case comprises
a second light source disposed inside one of the first side part and the second side part of the second case, and
a second connector electrically connected to the second light source and disposed in the second edge part of the top surface of the second case, wherein the connection member comprises
a first connection terminal electrically connected to the first connector, and
a second connection terminal electrically connected to the second connector, and wherein the connection member is
disposed on the first edge part of the top surface of the first case and the second edge part of the top surface of the second case, and
coupled to the first and the second side parts of the first case and the first and the second side parts of the second case.

2. The lighting device of claim 1,
wherein each of the first edge part of the first case and the second edge part of the second case comprises:
a main base having a second opening;
a first extension part extended from one end of the main base; and
a second extension part extended from the first extension part,
wherein the first connector is disposed in the second opening of the main base of the first case,
wherein the second connector is disposed in the second opening of the main base of the second case, and
wherein the connection member comprises
a base disposed on the main bases of the first case and the second case and having the first connection terminal and the second connection terminal,
an extension part extended from the base and coupled to the first extension parts of the first case and the second case, and
a hook extended from the extension part and coupled to the second extension parts of the first case and the second case.

3. The lighting device of claim 2, wherein the first connection terminal is electrically connected to the second connection terminal within the base of the connection member.

4. The lighting device of claim 2,
wherein each of the first extension parts of the first case and the second case comprises a guide, and
wherein the extension part of the connection member has a central opening on which the guide is disposed.

5. The lighting device of claim 4,
wherein the first light source comprises a first driving driver,
wherein the first extension part of the first case comprises a third opening on which the first driving driver is disposed,
wherein the second light source comprises a second driving driver, wherein the first extension part of the second case comprises a fourth opening on which the second driving driver is disposed, and
wherein the third opening and the fourth opening are disposed on the central opening of the connection member.

6. The lighting device of claim 5,
wherein the first light source comprises a substrate and a plurality of light emitting devices,
wherein the plurality of the light emitting devices is disposed on one surface of the substrate, and
wherein the first driving driver is disposed on the other surface of the substrate.

7. The lighting device of claim 6,
wherein the substrate comprises a first portion, a second portion and a middle portion disposed between the first portion and the second portion,
wherein the plurality of the light emitting devices comprises a first light emitting device group disposed on the first portion of the substrate, and a second light emitting device group disposed on the second portion of the substrate,
wherein the middle portion of the substrate is electrically isolated, and
wherein the first driving driver comprises a first A driving driver driving the first emitting device group, and a second A driving driver driving the second emitting device group.

8. The lighting device of claim 6,
wherein the substrate comprises a first substrate and a second substrate spaced apart from the first substrate,
wherein the plurality of the light emitting devices comprises a first light emitting device group disposed on the first substrate, and a second light emitting device group disposed on the second substrate, and
wherein the first driving driver comprises a first A driving driver driving the first emitting device group, and a second A driving driver driving the second emitting device group.

9. The lighting device of claim 2, wherein the extension part of the connection member comprises an impact protector disposed inside a surface of the connection member.

10. The lighting device of claim 1, wherein at least one of the first case and the second case has a fan shape.

11. A lighting device comprising:
a case comprising a first case and a second case;
a connection member connecting the first case with the second case; and
a plurality of coupling member coupling the case with the connection member,
wherein each of the first case and the second case comprises,
a top surface and a bottom surface, the bottom surface having a first opening,
a first edge part and a second edge part of the top surface, and
a first side part and a second side part disposed between the first edge part and the second edge part,
wherein the first edge part of the first case comes in contact with the second edge part of the second case,
wherein the connection member is disposed on the first edge part of the top surface of the first case and the second edge part of the top surface of the second case,
wherein the first edge part of the top surface of the first case has a second opening,
wherein the second edge part of the top surface of the second case has a third opening, wherein the connection member has a first recess corresponding to the second opening of the first case, and a second recess corresponding to the third opening of the second case;

wherein the plurality of coupling member comprises a first coupling member coupling the second opening of the first case with the first recess, and a second coupling member coupling the third opening of the second case with the second recess;

wherein the first case comprises
- a first light source disposed inside one of the first side part and the second side part of the first case, and
- a first connector electrically connected to the first light source and disposed on the first edge part of the top surface of the first case, wherein the second case comprises
- a second light source disposed inside one of the first side part and the second side part of the second case, and
- a second connector electrically connected to the second light source and disposed on the second edge part of the top surface of the second case, and wherein the connection member comprises a first connection terminal electrically connected to the first connector, and a second connection terminal electrically connected to the second connector.

12. The lighting device of claim 11,
wherein each of the second opening of the first case and the first recess has an insertion hole and a guide groove, and
wherein the plurality of coupling member is inserted into the insertion hole and is fixed on the guide groove.

13. The lighting device of claim 11,
wherein the first edge part of the first case has a fourth opening,
wherein the second edge part of the second case has a fifth opening,
wherein the connection member has a third recess corresponding to the fourth opening, and a fourth recess corresponding to the fifth opening, and
wherein a distance between the second opening and the third opening is different from a distance between the fourth opening and the fifth opening.

14. The lighting device of claim 11,
wherein the first edge part of the first case has a first connector opening on which the first connector is disposed,
wherein the second edge part of the second case has a second connector opening on which the second connector is disposed, and
wherein the first connection terminal is electrically connected to the second connection terminal within the connection member.

15. The lighting device of claim 11,
wherein the connection member comprises a projection, and
wherein the projection is an electrical connector.

16. The lighting device of claim 11,
wherein the first light source comprises a substrate, a plurality of light emitting devices, and a driving driver for driving the plurality of the light emitting devices,
wherein the plurality of the light emitting devices is disposed on one surface of the substrate, and
wherein the driving driver is disposed on the other surface of the substrate.

17. The lighting device of claim 16,
wherein the substrate comprises a first portion, a second portion and a middle portion disposed between the first portion and the second portion,
wherein the plurality of the light emitting devices comprises a first light emitting device group disposed on the first portion of the substrate, and a second light emitting device group disposed on the second portion of the substrate,
wherein the middle portion of the substrate is electrically isolated, and
wherein the driving driver comprises a first driving driver for driving the first emitting device group, and a second driving driver for driving the second emitting device group.

18. The lighting device of claim 16,
wherein the substrate comprises a first substrate and a second substrate spaced apart from the first substrate,
wherein the plurality of the light emitting devices comprises a first light emitting device group disposed on the first substrate, and a second light emitting device group disposed on the second substrate, and
wherein the driving driver comprises a first driving driver for driving the first emitting device group, and a second driving driver for driving the second emitting device group.

19. The lighting device of claim 11, wherein at least one of the first case and the second case has a fan shape.

* * * * *